US009348795B1

(12) United States Patent
Langhammer

(10) Patent No.: US 9,348,795 B1
(45) Date of Patent: May 24, 2016

(54) PROGRAMMABLE DEVICE USING FIXED AND CONFIGURABLE LOGIC TO IMPLEMENT FLOATING-POINT ROUNDING

(71) Applicant: Altera Corporation, San Jose, CA (US)

(72) Inventor: Martin Langhammer, Salisbury (GB)

(73) Assignee: ALTERA CORPORATION, San Jose, CA (US)

( * ) Notice: Subject to any disclaimer, the term of this patent is extended or adjusted under 35 U.S.C. 154(b) by 279 days.

(21) Appl. No.: 13/934,421

(22) Filed: Jul. 3, 2013

(51) Int. Cl.
  *G06F 17/10* (2006.01)
  *G06F 7/499* (2006.01)
  *G06F 7/49* (2006.01)

(52) U.S. Cl.
  CPC . *G06F 17/10* (2013.01); *G06F 7/49* (2013.01)

(58) Field of Classification Search
  CPC . G06F 7/499; G06F 7/49915; G06F 7/49947; G06F 7/49952; G06F 7/49957
  See application file for complete search history.

(56) References Cited

U.S. PATENT DOCUMENTS

| | | | |
|---|---|---|---|
| 3,473,160 A | 10/1969 | Wahlstrom | |
| 3,697,734 A | 10/1972 | Booth et al. | |
| 3,800,130 A | 3/1974 | Martinson et al. | |
| 3,814,924 A | 6/1974 | Tate | |
| 3,896,299 A | 7/1975 | Rhodes | |
| 4,156,927 A | 5/1979 | McElroy et al. | |
| 4,179,746 A | 12/1979 | Tubbs | |
| 4,212,076 A | 7/1980 | Conners | |
| 4,215,406 A | 7/1980 | Gomola et al. | |
| 4,215,407 A | 7/1980 | Gomola et al. | |
| 4,422,155 A | 12/1983 | Amir et al. | |
| 4,484,259 A | 11/1984 | Palmer et al. | |
| 4,521,907 A | 6/1985 | Amir et al. | |
| 4,575,812 A | 3/1986 | Kloker et al. | |
| 4,597,053 A | 6/1986 | Chamberlin | |
| 4,616,330 A | 10/1986 | Betz | |

(Continued)

FOREIGN PATENT DOCUMENTS

| | | |
|---|---|---|
| EP | 0 158 430 | 10/1985 |
| EP | 0 326 415 | 8/1989 |

(Continued)

OTHER PUBLICATIONS

Altera, "DSP Blocks in Stratix III Devices," Chapter 5, pp. 1-42, Mar. 2010.

(Continued)

*Primary Examiner* — Chuong D Ngo

(57) ABSTRACT

A configurable specialized processing block includes a first floating-point arithmetic operator stage, a second floating-point arithmetic operator stage, and configurable interconnect within the configurable specialized processing block for routing signals into and out of each of the first and second floating-point arithmetic operator stages. In some embodiments, the configurable interconnect may be configurable to route a plurality of block inputs to inputs of the first floating-point arithmetic operator stage, at least one of the block inputs to an input of the second floating-point arithmetic operator stage, output of the first floating-point arithmetic operator stage to an input of the second floating-point arithmetic operator stage, at least one of the block inputs to a direct-connect output to another such block, output of the first floating-point arithmetic operator stage to the direct-connect output, and a direct-connect input from another such block to an input of the second floating-point arithmetic operator stage.

15 Claims, 13 Drawing Sheets

(56) References Cited

U.S. PATENT DOCUMENTS

| | | |
|---|---|---|
| 4,623,961 A | 11/1986 | Mackiewicz |
| 4,682,302 A | 7/1987 | Williams |
| 4,718,057 A | 1/1988 | Venkitakrishnan et al. |
| 4,727,508 A | 2/1988 | Williams |
| 4,736,335 A | 4/1988 | Barkan |
| 4,754,421 A | 6/1988 | Bosshart |
| 4,777,614 A | 10/1988 | Ward |
| 4,791,590 A | 12/1988 | Ku et al. |
| 4,799,004 A | 1/1989 | Mori |
| 4,811,263 A | 3/1989 | Hedley et al. |
| 4,823,260 A | 4/1989 | Imel et al. |
| 4,823,295 A | 4/1989 | Mader |
| 4,839,847 A | 6/1989 | Laprade |
| 4,871,930 A | 10/1989 | Wong et al. |
| 4,893,268 A | 1/1990 | Denman et al. |
| 4,908,788 A | 3/1990 | Fujiyama |
| 4,912,345 A | 3/1990 | Steele et al. |
| 4,918,637 A | 4/1990 | Morton |
| 4,967,160 A | 10/1990 | Quievy et al. |
| 4,982,354 A | 1/1991 | Takeuchi et al. |
| 4,991,010 A | 2/1991 | Hailey et al. |
| 4,994,997 A | 2/1991 | Martin et al. |
| 4,999,803 A | 3/1991 | Turrini et al. |
| 5,068,813 A | 11/1991 | Thoen |
| 5,073,863 A | 12/1991 | Zhang |
| 5,081,604 A | 1/1992 | Tanaka |
| 5,122,685 A | 6/1992 | Chan et al. |
| 5,128,559 A | 7/1992 | Steele |
| 5,175,702 A | 12/1992 | Beraud et al. |
| 5,208,491 A | 5/1993 | Ebeling et al. |
| RE34,363 E | 8/1993 | Freeman |
| 5,267,187 A | 11/1993 | Hsieh et al. |
| 5,296,759 A | 3/1994 | Sutherland et al. |
| 5,338,983 A | 8/1994 | Agarwala |
| 5,339,263 A | 8/1994 | White |
| 5,349,250 A | 9/1994 | New |
| 5,357,152 A | 10/1994 | Jennings, III et al. |
| 5,371,422 A | 12/1994 | Patel et al. |
| 5,373,461 A | 12/1994 | Bearden et al. |
| 5,375,079 A | 12/1994 | Uramoto et al. |
| 5,381,357 A | 1/1995 | Wedgwood et al. |
| 5,404,324 A | 4/1995 | Colon-Bonet |
| 5,424,589 A | 6/1995 | Dobbelaere et al. |
| 5,446,651 A | 8/1995 | Moyse et al. |
| 5,451,948 A | 9/1995 | Jekel |
| 5,452,231 A | 9/1995 | Butts et al. |
| 5,452,375 A | 9/1995 | Rousseau et al. |
| 5,457,644 A | 10/1995 | McCollum |
| 5,465,226 A | 11/1995 | Goto |
| 5,465,375 A | 11/1995 | Thepaut et al. |
| 5,483,178 A | 1/1996 | Costello et al. |
| 5,497,498 A | 3/1996 | Taylor |
| 5,500,812 A | 3/1996 | Saishi et al. |
| 5,500,828 A | 3/1996 | Doddington et al. |
| 5,523,963 A | 6/1996 | Hsieh et al. |
| 5,528,550 A | 6/1996 | Pawate et al. |
| 5,537,601 A | 7/1996 | Kimura et al. |
| 5,541,864 A | 7/1996 | Van Bavel et al. |
| 5,546,018 A | 8/1996 | New et al. |
| 5,550,993 A | 8/1996 | Ehlig et al. |
| 5,559,450 A | 9/1996 | Ngai et al. |
| 5,563,526 A | 10/1996 | Hastings et al. |
| 5,563,819 A | 10/1996 | Nelson |
| 5,570,039 A | 10/1996 | Oswald et al. |
| 5,570,040 A | 10/1996 | Lytle et al. |
| 5,572,148 A | 11/1996 | Lytle et al. |
| 5,581,501 A | 12/1996 | Sansbury et al. |
| 5,590,350 A | 12/1996 | Guttag et al. |
| 5,594,366 A | 1/1997 | Khong et al. |
| 5,594,912 A | 1/1997 | Brueckmann et al. |
| 5,596,763 A | 1/1997 | Guttag et al. |
| 5,606,266 A | 2/1997 | Pedersen |
| 5,617,058 A | 4/1997 | Adrian et al. |
| 5,623,377 A | 4/1997 | Behrens et al. |
| 5,631,848 A | 5/1997 | Laczko et al. |
| 5,631,859 A | 5/1997 | Markstein et al. |
| 5,633,601 A | 5/1997 | Nagaraj |
| 5,636,150 A | 6/1997 | Okamoto |
| 5,636,368 A | 6/1997 | Harrison et al. |
| 5,640,578 A | 6/1997 | Balmer et al. |
| 5,644,519 A | 7/1997 | Yatim et al. |
| 5,644,522 A | 7/1997 | Moyse et al. |
| 5,646,545 A | 7/1997 | Trimberger et al. |
| 5,646,875 A | 7/1997 | Taborn et al. |
| 5,648,732 A | 7/1997 | Duncan |
| 5,652,903 A | 7/1997 | Weng et al. |
| 5,655,069 A | 8/1997 | Ogawara et al. |
| 5,664,192 A | 9/1997 | Lloyd et al. |
| 5,689,195 A | 11/1997 | Cliff et al. |
| 5,696,708 A | 12/1997 | Leung |
| 5,729,495 A | 3/1998 | Madurawe |
| 5,740,404 A | 4/1998 | Baji |
| 5,744,980 A | 4/1998 | McGowan et al. |
| 5,744,991 A | 4/1998 | Jefferson et al. |
| 5,754,459 A | 5/1998 | Telikepalli |
| 5,761,483 A | 6/1998 | Trimberger |
| 5,764,555 A | 6/1998 | McPherson et al. |
| 5,768,613 A | 6/1998 | Asghar |
| 5,771,186 A | 6/1998 | Kodali et al. |
| 5,777,912 A | 7/1998 | Leung et al. |
| 5,784,636 A | 7/1998 | Rupp |
| 5,790,446 A | 8/1998 | Yu et al. |
| 5,794,067 A | 8/1998 | Kadowaki |
| 5,801,546 A | 9/1998 | Pierce et al. |
| 5,805,477 A | 9/1998 | Perner |
| 5,805,913 A | 9/1998 | Guttag et al. |
| 5,808,926 A | 9/1998 | Gorshtein et al. |
| 5,812,479 A | 9/1998 | Cliff et al. |
| 5,812,562 A | 9/1998 | Baeg |
| 5,815,422 A | 9/1998 | Dockser |
| 5,821,776 A | 10/1998 | McGowan |
| 5,825,202 A | 10/1998 | Tavana et al. |
| 5,838,165 A | 11/1998 | Chatter |
| 5,841,684 A | 11/1998 | Dockser |
| 5,847,579 A | 12/1998 | Trimberger |
| 5,847,978 A | 12/1998 | Ogura et al. |
| 5,847,981 A | 12/1998 | Kelley et al. |
| 5,859,878 A | 1/1999 | Phillips et al. |
| 5,869,979 A | 2/1999 | Bocchino |
| 5,872,380 A | 2/1999 | Rostoker et al. |
| 5,874,834 A | 2/1999 | New |
| 5,878,250 A | 3/1999 | LeBlanc |
| 5,880,981 A | 3/1999 | Kojima et al. |
| 5,892,962 A | 4/1999 | Cloutier |
| 5,894,228 A | 4/1999 | Reddy et al. |
| 5,898,602 A | 4/1999 | Rothman et al. |
| 5,931,898 A | 8/1999 | Khoury |
| 5,942,914 A | 8/1999 | Reddy et al. |
| 5,944,774 A | 8/1999 | Dent |
| 5,949,710 A | 9/1999 | Pass et al. |
| 5,951,673 A | 9/1999 | Miyata |
| 5,956,265 A | 9/1999 | Lewis |
| 5,959,871 A | 9/1999 | Pierzchala et al. |
| 5,960,193 A | 9/1999 | Guttag et al. |
| 5,961,635 A | 10/1999 | Guttag et al. |
| 5,963,048 A | 10/1999 | Harrison et al. |
| 5,963,050 A | 10/1999 | Young et al. |
| 5,968,196 A | 10/1999 | Ramamurthy et al. |
| 5,970,254 A | 10/1999 | Cooke et al. |
| 5,978,260 A | 11/1999 | Trimberger et al. |
| 5,982,195 A | 11/1999 | Cliff et al. |
| 5,986,465 A | 11/1999 | Mendel |
| 5,991,788 A | 11/1999 | Mintzer |
| 5,991,898 A | 11/1999 | Rajski et al. |
| 5,995,748 A | 11/1999 | Guttag et al. |
| 5,999,015 A | 12/1999 | Cliff et al. |
| 5,999,990 A | 12/1999 | Sharrit et al. |
| 6,005,806 A | 12/1999 | Madurawe et al. |
| 6,006,321 A | 12/1999 | Abbott |
| 6,009,451 A | 12/1999 | Burns |
| 6,018,755 A | 1/2000 | Gonikberg et al. |
| 6,020,759 A | 2/2000 | Heile |
| 6,021,423 A | 2/2000 | Nag et al. |
| 6,029,187 A | 2/2000 | Verbauwhede |

(56) References Cited

U.S. PATENT DOCUMENTS

| | | |
|---|---|---|
| 6,031,763 A | 2/2000 | Sansbury |
| 6,041,339 A | 3/2000 | Yu et al. |
| 6,041,340 A | 3/2000 | Mintzer |
| 6,052,327 A | 4/2000 | Reddy et al. |
| 6,052,755 A | 4/2000 | Terrill et al. |
| 6,052,773 A | 4/2000 | DeHon et al. |
| 6,055,555 A | 4/2000 | Boswell et al. |
| 6,064,614 A | 5/2000 | Khoury |
| 6,065,131 A | 5/2000 | Andrews et al. |
| 6,066,960 A | 5/2000 | Pedersen |
| 6,069,487 A | 5/2000 | Lane et al. |
| 6,072,994 A | 6/2000 | Phillips et al. |
| 6,073,154 A | 6/2000 | Dick |
| 6,075,381 A | 6/2000 | LaBerge |
| 6,084,429 A | 7/2000 | Trimberger |
| 6,085,317 A | 7/2000 | Smith |
| 6,091,261 A | 7/2000 | DeLange |
| 6,091,765 A | 7/2000 | Pietzold, III et al. |
| 6,094,726 A | 7/2000 | Gonion et al. |
| 6,097,988 A | 8/2000 | Tobias |
| 6,098,163 A | 8/2000 | Guttag et al. |
| 6,107,820 A | 8/2000 | Jefferson et al. |
| 6,107,821 A | 8/2000 | Kelem et al. |
| 6,107,824 A | 8/2000 | Reddy et al. |
| 6,108,772 A | 8/2000 | Sharangpani |
| 6,130,554 A | 10/2000 | Kolze et al. |
| 6,140,839 A | 10/2000 | Kaviani et al. |
| 6,144,980 A | 11/2000 | Oberman |
| 6,154,049 A | 11/2000 | New |
| 6,157,210 A | 12/2000 | Zaveri et al. |
| 6,163,788 A | 12/2000 | Chen et al. |
| 6,167,415 A | 12/2000 | Fischer et al. |
| 6,175,849 B1 | 1/2001 | Smith |
| 6,215,326 B1 | 4/2001 | Jefferson et al. |
| 6,226,735 B1 | 5/2001 | Mirsky |
| 6,242,947 B1 | 6/2001 | Trimberger |
| 6,243,729 B1 | 6/2001 | Staszewski |
| 6,246,258 B1 | 6/2001 | Lesea |
| 6,260,053 B1 | 7/2001 | Maulik et al. |
| 6,279,021 B1 | 8/2001 | Takano et al. |
| 6,286,024 B1 | 9/2001 | Yano et al. |
| 6,314,442 B1 | 11/2001 | Suzuki |
| 6,314,551 B1 | 11/2001 | Borland |
| 6,321,246 B1 | 11/2001 | Page et al. |
| 6,323,680 B1 | 11/2001 | Pedersen et al. |
| 6,327,605 B2 | 12/2001 | Arakawa et al. |
| 6,346,824 B1 | 2/2002 | New |
| 6,351,142 B1 | 2/2002 | Abbott |
| 6,353,843 B1 | 3/2002 | Chehrazi et al. |
| 6,359,468 B1 | 3/2002 | Park et al. |
| 6,360,240 B1 | 3/2002 | Takano et al. |
| 6,362,650 B1 | 3/2002 | New et al. |
| 6,366,944 B1 | 4/2002 | Hossain et al. |
| 6,367,003 B1 | 4/2002 | Davis |
| 6,369,610 B1 | 4/2002 | Cheung et al. |
| 6,377,970 B1 | 4/2002 | Abdallah et al. |
| 6,385,632 B1 | 5/2002 | Choe et al. |
| 6,407,576 B1 | 6/2002 | Ngai et al. |
| 6,407,694 B1 | 6/2002 | Cox et al. |
| 6,427,157 B1 | 7/2002 | Webb |
| 6,434,587 B1 | 8/2002 | Liao et al. |
| 6,438,569 B1 | 8/2002 | Abbott |
| 6,438,570 B1 | 8/2002 | Miller |
| 6,446,107 B1 | 9/2002 | Knowles |
| 6,453,382 B1 | 9/2002 | Heile |
| 6,467,017 B1 | 10/2002 | Ngai et al. |
| 6,480,980 B2 | 11/2002 | Koe |
| 6,483,343 B1 | 11/2002 | Faith et al. |
| 6,487,575 B1 | 11/2002 | Oberman |
| 6,523,055 B1 | 2/2003 | Yu et al. |
| 6,523,057 B1 | 2/2003 | Savo et al. |
| 6,531,888 B2 | 3/2003 | Abbott |
| 6,538,470 B1 | 3/2003 | Langhammer et al. |
| 6,542,000 B1 | 4/2003 | Black et al. |
| 6,556,044 B2 | 4/2003 | Langhammer et al. |
| 6,557,092 B1 | 4/2003 | Callen |
| 6,564,238 B1 | 5/2003 | Kim et al. |
| 6,571,268 B1 | 5/2003 | Giacalone et al. |
| 6,573,749 B2 | 6/2003 | New et al. |
| 6,574,762 B1 | 6/2003 | Karimi et al. |
| 6,578,060 B2 | 6/2003 | Chen et al. |
| 6,591,283 B1 | 7/2003 | Conway et al. |
| 6,591,357 B2 | 7/2003 | Mirsky |
| 6,600,495 B1 | 7/2003 | Boland et al. |
| 6,600,788 B1 | 7/2003 | Dick et al. |
| 6,628,140 B2 | 9/2003 | Langhammer et al. |
| 6,687,722 B1 | 2/2004 | Larsson et al. |
| 6,692,534 B1 | 2/2004 | Wang et al. |
| 6,700,581 B2 | 3/2004 | Baldwin et al. |
| 6,725,441 B1 | 4/2004 | Keller et al. |
| 6,728,901 B1 | 4/2004 | Rajski et al. |
| 6,731,133 B1 | 5/2004 | Feng et al. |
| 6,732,134 B1 | 5/2004 | Rosenberg |
| 6,744,278 B1 | 6/2004 | Liu et al. |
| 6,745,254 B2 | 6/2004 | Boggs et al. |
| 6,763,367 B2 | 7/2004 | Kwon et al. |
| 6,771,094 B1 | 8/2004 | Langhammer et al. |
| 6,774,669 B1 | 8/2004 | Liu et al. |
| 6,781,408 B1 | 8/2004 | Langhammer |
| 6,781,410 B2 | 8/2004 | Pani et al. |
| 6,788,104 B2 | 9/2004 | Singh et al. |
| 6,801,924 B1 | 10/2004 | Green et al. |
| 6,806,733 B1 | 10/2004 | Pan et al. |
| 6,836,839 B2 | 12/2004 | Master et al. |
| 6,874,079 B2 | 3/2005 | Hogenauer |
| 6,889,238 B2 | 5/2005 | Johnson |
| 6,904,471 B2 | 6/2005 | Boggs et al. |
| 6,915,322 B2 | 7/2005 | Hong |
| 6,917,955 B1 | 7/2005 | Botchev |
| 6,924,663 B2 | 8/2005 | Masui et al. |
| 6,963,890 B2 | 11/2005 | Dutta et al. |
| 6,971,083 B1 | 11/2005 | Farrugia et al. |
| 6,978,287 B1 | 12/2005 | Langhammer |
| 6,983,300 B2 | 1/2006 | Ferroussat |
| 7,020,673 B2 | 3/2006 | Ozawa |
| 7,024,446 B2 | 4/2006 | Langhammer et al. |
| 7,047,272 B2 | 5/2006 | Giacalone et al. |
| 7,062,526 B1 | 6/2006 | Hoyle |
| 7,093,204 B2 | 8/2006 | Oktem et al. |
| 7,107,305 B2 | 9/2006 | Deng et al. |
| 7,113,969 B1 | 9/2006 | Green et al. |
| 7,181,484 B2 | 2/2007 | Stribaek et al. |
| 7,200,631 B2 | 4/2007 | Mailaender et al. |
| 7,230,451 B1 | 6/2007 | Langhammer |
| 7,313,585 B2 | 12/2007 | Winterrowd |
| 7,343,388 B1 | 3/2008 | Burney et al. |
| 7,395,298 B2 | 7/2008 | Debes et al. |
| 7,401,109 B2 | 7/2008 | Koc et al. |
| 7,409,417 B2 | 8/2008 | Lou |
| 7,415,542 B2 | 8/2008 | Hennedy et al. |
| 7,421,465 B1 | 9/2008 | Rarick et al. |
| 7,428,565 B2 | 9/2008 | Fujimori |
| 7,428,566 B2 | 9/2008 | Siu et al. |
| 7,430,578 B2 | 9/2008 | Debes et al. |
| 7,430,656 B2 | 9/2008 | Sperber et al. |
| 7,447,310 B2 | 11/2008 | Koc et al. |
| 7,472,155 B2 | 12/2008 | Simkins et al. |
| 7,508,936 B2 | 3/2009 | Eberle et al. |
| 7,536,430 B2 | 5/2009 | Guevokian et al. |
| 7,567,997 B2 | 7/2009 | Simkins et al. |
| 7,590,676 B1 | 9/2009 | Langhammer |
| 7,646,430 B2 | 1/2010 | Brown Elliott et al. |
| 7,650,374 B1 | 1/2010 | Gura et al. |
| 7,668,896 B2 | 2/2010 | Lutz et al. |
| 7,719,446 B2 | 5/2010 | Rosenthal et al. |
| 7,720,898 B2 | 5/2010 | Driker et al. |
| 7,769,797 B2 | 8/2010 | Cho et al. |
| 7,814,136 B1 | 10/2010 | Verma et al. |
| 7,814,137 B1 | 10/2010 | Mauer |
| 7,822,799 B1 | 10/2010 | Langhammer et al. |
| 7,836,117 B1 | 11/2010 | Langhammer et al. |
| 7,865,541 B1 | 1/2011 | Langhammer |
| 7,917,567 B1 | 3/2011 | Mason et al. |
| 7,930,335 B2 | 4/2011 | Gura |

(56) References Cited

U.S. PATENT DOCUMENTS

| | | | |
|---|---|---|---|
| 7,930,336 B2 | 4/2011 | Langhammer |
| 7,949,699 B1 | 5/2011 | Neoh et al. |
| 7,974,997 B2 | 7/2011 | Arviv et al. |
| 8,024,394 B2 | 9/2011 | Prokopenko |
| 8,041,759 B1 | 10/2011 | Langhammer et al. |
| 8,090,758 B1 | 1/2012 | Shimanek et al. |
| 8,112,466 B2 | 2/2012 | Minz et al. |
| 8,301,681 B1 | 10/2012 | Lee et al. |
| 8,307,023 B1 | 11/2012 | Leung et al. |
| 8,386,550 B1 | 2/2013 | Mauer et al. |
| 8,386,553 B1 | 2/2013 | Langhammer et al. |
| 8,396,914 B1 | 3/2013 | Langhammer |
| 8,447,800 B2 | 5/2013 | Dockser et al. |
| 8,463,835 B1 * | 6/2013 | Walke ............................. 708/505 |
| 8,468,191 B2 | 6/2013 | Mantor et al. |
| 8,595,279 B2 | 11/2013 | Dockser |
| 8,751,551 B2 | 6/2014 | Streicher et al. |
| 2001/0023425 A1 | 9/2001 | Oberman et al. |
| 2001/0029515 A1 | 10/2001 | Mirsky |
| 2001/0037351 A1 | 11/2001 | Hellberg |
| 2001/0037352 A1 | 11/2001 | Hong |
| 2002/0002573 A1 | 1/2002 | Landers et al. |
| 2002/0032713 A1 | 3/2002 | Jou et al. |
| 2002/0038324 A1 | 3/2002 | Page et al. |
| 2002/0049798 A1 | 4/2002 | Wang et al. |
| 2002/0078114 A1 | 6/2002 | Wang et al. |
| 2002/0089348 A1 | 7/2002 | Langhammer |
| 2002/0116434 A1 | 8/2002 | Nancekievill |
| 2002/0129073 A1 | 9/2002 | Page et al. |
| 2002/0143841 A1 | 10/2002 | Farooqui et al. |
| 2003/0065699 A1 | 4/2003 | Burns |
| 2003/0088757 A1 | 5/2003 | Lindner et al. |
| 2004/0064770 A1 | 4/2004 | Xin |
| 2004/0083412 A1 | 4/2004 | Corbin et al. |
| 2004/0103133 A1 | 5/2004 | Gurney |
| 2004/0122882 A1 | 6/2004 | Zakharov et al. |
| 2004/0148321 A1 | 7/2004 | Guevorkian et al. |
| 2004/0172439 A1 | 9/2004 | Lin |
| 2004/0178818 A1 | 9/2004 | Crotty et al. |
| 2004/0193981 A1 | 9/2004 | Clark et al. |
| 2004/0267857 A1 | 12/2004 | Abel et al. |
| 2004/0267863 A1 | 12/2004 | Bhushan et al. |
| 2005/0038842 A1 | 2/2005 | Stoye |
| 2005/0120122 A1 | 6/2005 | Farnham |
| 2005/0144212 A1 | 6/2005 | Simkins et al. |
| 2005/0144215 A1 | 6/2005 | Simkins et al. |
| 2005/0144216 A1 | 6/2005 | Simkins et al. |
| 2005/0166038 A1 | 7/2005 | Wang et al. |
| 2005/0187997 A1 | 8/2005 | Zheng et al. |
| 2005/0187999 A1 | 8/2005 | Zheng et al. |
| 2005/0262175 A1 | 11/2005 | Iino et al. |
| 2006/0020655 A1 | 1/2006 | Lin |
| 2006/0059215 A1 | 3/2006 | Maharatna et al. |
| 2006/0112160 A1 | 5/2006 | Ishii et al. |
| 2007/0083585 A1 | 4/2007 | St. Denis et al. |
| 2007/0124352 A1 | 5/2007 | Wittig |
| 2007/0185951 A1 | 8/2007 | Lee et al. |
| 2007/0185952 A1 | 8/2007 | Langhammer et al. |
| 2007/0226287 A1 | 9/2007 | Lin et al. |
| 2007/0241773 A1 | 10/2007 | Hutchings et al. |
| 2008/0133627 A1 | 6/2008 | Langhammer et al. |
| 2008/0159441 A1 | 7/2008 | Liao et al. |
| 2008/0183783 A1 | 7/2008 | Tubbs |
| 2009/0028455 A1 | 1/2009 | Nakamura et al. |
| 2009/0083358 A1 | 3/2009 | Allen |
| 2009/0113186 A1 | 4/2009 | Kato et al. |
| 2009/0172052 A1 | 7/2009 | DeLaquil et al. |
| 2009/0182795 A1 | 7/2009 | Dobbek et al. |
| 2009/0187615 A1 | 7/2009 | Abe et al. |
| 2009/0228689 A1 | 9/2009 | Muff et al. |
| 2009/0292750 A1 | 11/2009 | Reyzin et al. |
| 2009/0300088 A1 | 12/2009 | Michaels et al. |
| 2009/0300323 A1 | 12/2009 | Hessel et al. |
| 2010/0098189 A1 | 4/2010 | Oketani |
| 2010/0131577 A1 | 5/2010 | Gangalakurti et al. |
| 2010/0146022 A1 | 6/2010 | Swartzlander et al. |
| 2010/0191939 A1 | 7/2010 | Muff et al. |
| 2011/0106868 A1 | 5/2011 | Lutz |
| 2011/0137970 A1 | 6/2011 | Dockser et al. |
| 2011/0161389 A1 | 6/2011 | Langhammer et al. |
| 2011/0219052 A1 | 9/2011 | Langhammer |
| 2011/0238720 A1 | 9/2011 | Langhammer |
| 2011/0320513 A1 | 12/2011 | Langhammer |
| 2012/0054254 A1 | 3/2012 | Langhammer |
| 2012/0054256 A1 | 3/2012 | Langhammer |
| 2012/0113133 A1 | 5/2012 | Shpigelblat |
| 2012/0166512 A1 | 6/2012 | Wong et al. |
| 2012/0191967 A1 | 7/2012 | Lin et al. |
| 2012/0290819 A1 | 11/2012 | Langhammer |
| 2013/0138711 A1 | 5/2013 | Sugisawa |
| 2014/0067895 A1 | 3/2014 | Wang |
| 2014/0089371 A1 | 3/2014 | De Dinechin et al. |

FOREIGN PATENT DOCUMENTS

| | | |
|---|---|---|
| EP | 0 380 456 | 8/1990 |
| EP | 0 411 491 | 2/1991 |
| EP | 0 419 105 | 3/1991 |
| EP | 0 461 798 | 12/1991 |
| EP | 0 498 066 | 8/1992 |
| EP | 0 555 092 | 8/1993 |
| EP | 0 606 653 | 7/1994 |
| EP | 0 657 803 | 6/1995 |
| EP | 0 660 227 | 6/1995 |
| EP | 0 668 659 | 8/1995 |
| EP | 0 721 159 | 7/1996 |
| EP | 0 905 906 | 3/1999 |
| EP | 0 909 028 | 4/1999 |
| EP | 0 927 393 | 7/1999 |
| EP | 0 992 885 | 4/2000 |
| EP | 1 031 934 | 8/2000 |
| EP | 1 049 025 | 11/2000 |
| EP | 1 058 185 | 12/2000 |
| EP | 1 220 108 | 7/2002 |
| GB | 2 283 602 | 5/1995 |
| GB | 2 286 737 | 8/1995 |
| GB | 2 318 198 | 4/1998 |
| JP | 61-237133 | 10/1986 |
| JP | 63-216131 | 8/1988 |
| JP | 4-332036 | 11/1992 |
| JP | 5-134851 | 6/1993 |
| JP | 06-187129 | 7/1994 |
| JP | 7-135447 | 5/1995 |
| JP | 11-296345 | 10/1999 |
| JP | 2000-259394 | 9/2000 |
| JP | 2002-108606 | 4/2002 |
| JP | 2002-251281 | 9/2002 |
| WO | WO95/27243 | 10/1995 |
| WO | WO96/28774 | 9/1996 |
| WO | WO97/08606 | 3/1997 |
| WO | WO98/12629 | 3/1998 |
| WO | WO98/32071 | 7/1998 |
| WO | WO98/38741 | 9/1998 |
| WO | WO99/22292 | 5/1999 |
| WO | WO99/31574 | 6/1999 |
| WO | WO99/56394 | 11/1999 |
| WO | WO00/51239 | 8/2000 |
| WO | WO00/52824 | 9/2000 |
| WO | WO01/13562 | 2/2001 |
| WO | WO 2005/066832 | 7/2005 |
| WO | WO 2005/101190 | 10/2005 |
| WO | WO 2010/102007 | 9/2010 |

OTHER PUBLICATIONS

Altera Corporation, "Statix II Device Handbook, Chapter 6—DSP Blocks in Stratix II Devices," v1.1, Jul. 2004.

Altera Corporation, "Digital Signal Processing (DSP)," *Stratix Device Handbook*, vol. 2, Chapter 6 and Chapter 7, v1.1 (Sep. 2004).

Altera Corporation, "DSP Blocks in Stratix II and Stratix II GX Devices," *Stratix II Device Handbook*, vol. 2, Chapter 6, v4.0 (Oct. 2005).

Altera Corporation, "FIR Compiler: MegaCore® Function User Guide," version 3.3.0, rev. 1, pp. 3-11 through 3-15 (Oct. 2005).

(56) References Cited

OTHER PUBLICATIONS

Altera Corporation, "Advanced Synthesis Cookbook: A Design Guide for Stratix II, Stratix III and Stratix IV Devices," Document Version 3.0, 112 pgs., May 2008.
Amos, D., "PLD architectures match DSP algorithms" *Electronic Product Design*, vol. 17, No. 7, Jul. 1996, pp. 30, 32.
Analog Devices, Inc., The Applications Engineering Staff of Analog Devices, DSP Division, *Digital Signal Processing Applications Using the ADSP-2100 Family* (edited by Amy Mar), 1990, pp. 141-192).
Andrejas, J., et al., "Reusable DSP functions in FPGAs," *Field-Programmable Logic and Applications. Roadmap to Reconfigurable Computing. 10th International Conference, FPL 2000. Proceedings (Lecture Notes in Computer Science* vol. 1896) Aug. 27-30, 2000, pp. 456-461.
Aoki, T., "Signed-weight arithmetic and its application to a field-programmable digital filter architecture," *IEICE Transactions on Electronics*, 1999, vol. E82C, No. 9, Sep. 1999, pp. 1687-1698.
Ashour, M.A., et al., "An FPGA implementation guide for some different types of serial-parallel multiplier-structures," *Microelectronics Journal*, vol. 31, No. 3, 2000, pp. 161-168.
Berg, B.L., et al."Designing Power and Area Efficient Multistage FIR Decimators with Economical Low Order Filters," *ChipCenter Technical Note*, Dec. 2001.
Bursky, D., "Programmable Logic Challenges Traditional ASIC SoC Designs", *Electronic Design*, Apr. 15, 2002.
Chhabra, A. et al., Texas Instruments Inc., "A Block Floating Point Implementation on the TMS320C54x DSP", Application Report SPRA610, Dec. 1999, pp. 1-10.
Colet, P., "When DSPs and FPGAs meet: Optimizing image processing architectures," *Advanced Imaging* vol. 12, No. 9, Sep. 1997, pp. 14, 16, 18.
Crookes, D., et al., "Design and implementation of a high level programming environment for FPGA-based image processing," *IEE Proceedings—Vision, Image and Signal Processing*, vol. 147, No. 4, Aug. 2000, pp. 377-384.
Debowski, L., et al., "A new flexible architecture of digital control systems based on DSP and complex CPLD technology for power conversion applications," *PCIM 2000: Europe Official Proceedings of the Thirty-Seventh International Intelligent Motion Conference*, Jun. 6-8, 2000, pp. 281-286.
deDinechin, F. et al., "Large multipliers with less DSP blocks," retrieved from http://hal-ens-lyon.archives-ouvertes.fr/ensl-00356421/en/, 9 pgs., available online Jan. 2009.
de Dinechin F.,et al., "FPGA-Specific Custom Arithmetic Datapath Design: LIP Research Report RR2010-34," Dec. 2010, 8 pages.
Dick, C., et al., "Configurable logic for digital communications: some signal processing perspectives," *IEEE Communications Magazine*, vol. 37, No. 8, Aug. 1999, pp. 107-111.
Do, T.-T., et al., "A flexible implementation of high-performance FIR filters on Xilinx FPGAs," *Field-Programmable Logic and Applications: From FPGAs to Computing Paradigm. 8th International Workshop, FPL'98. Proceedings*, Hartenstein, R.W., et al., eds., Aug. 31-Sep. 3, 1998, pp. 441-445.
Farooqui, A., et al., "General Data-Path Organization of a MAC unit for VLSI Implementation of DSP Processors," ISCAS '98, Part 2, May 31, 1998-Jun. 3, 1998, pp. 260-263.
Fujioka, Y., et al., "240 MOPS Reconfigurable Parallel VLSI Processor for Robot Control", Proceedings of the 1992 International Conference on Industrial Electronics, Control, Instrumentation, and Automation, vol. 3, pp. 1385-1390, Nov. 9-13, 1992.
Gaffer, A.A., et al., "Floating-Point Bitwidth Analysis via Automatic Differentiation," *IEEE Conference on Field Programmable Technology*, Hong Kong, Dec. 2002.
Govindu, G. et al., "A Library of Parameterizable Floating-Point Cores for FPGAs and Their Application to Scientific Computing," *Proc Int'l Conf. Eng. Reconfigurable Systems and Algorithms (ERSA'05)*, Jun. 2005.

Govindu, G. et al., "Analysis of High-performance Floating-point Arithmetic on FPGAs," *Proceedings of the 18th International Parallel and Distributed Processing Symposium (PDPS'04)*, pp. 149-156, Apr. 2004.
Guccione, S.A.,"Run-time Reconfiguration at Xilinx," *Parallel and distributed processing: 15 IPDPS 2000 workshops*, Rolim, J., ed., May 1-5, 2000, p. 873.
Hauck, S., "The Future of Reconfigurable Systems," *Keynote Address, 5th Canadian Conference on Field Programmable Devices*, Jun. 1998, http:--www.ee.washington.edu-people-faculty-hauck-publications-ReconfigFuture.PDF.
Haynes, S.D., et al., "Configurable multiplier blocks for embedding in FPGAs," *Electronicas Letters*, vol. 34, No. 7, pp. 638-639 (Apr. 2, 1998).
Heysters, P.M., et al., "Mapping of DSP algorithms on field programmable function arrays," *Field-Programmable Logic and Applications. Roadmap to Reconfigurable Computing. 10th International Conference, FPL 2000. Proceedings (Lecture Notes in Computer Science* vol. 1896), Aug. 27-30, 2000, pp. 400-411.
Huang, J., et al., "Simulated Performance of 1000Base-T Receiver with Different Analog Front End Designs," *Proceedings of the 35th Asilomar Conference on Signals, Systems, and Computers*, Nov. 4-7, 2001.
IEEE Standard for Binary Floating-Point Arithmetic, *ANSI/IEEE Standard, Std 754*, 1985, pp. 1-14.
IEEE Standard for Floating-Point Arithmetic, *IEEE STD 754*, 2008, pp. 1-58.
"Implementing Multipliers in FLEX 10K EABs", *Altera*, Mar. 1996.
"Implementing Logic with the Embedded Array in FLEX 10K Devices", *Altera*, May 2001, ver. 2.1.
Jinghua Li, "Design a pocket multi-bit multiplier in FPGA," *1996 2nd International Conference on ASIC Proceedings (IEEE* Cat. No. 96TH8140) Oct. 21-24, 1996, pp. 275-279.
Jones, G., "Field-programmable digital signal conditioning" *Electronic Product Design*, vol. 21, No. 6, Jun. 2000, pp. C36-C38.
Karlstrom, K., et al., "High Performance, Low Latency FPGA based Floating Point Adder and Multiplier Units in a Virtex 4," Norchip Conf., pp. 31-34, 2006.
Kiefer, R., et al., "Performance comparison of software-FPGA hardware partitions for a DSP application," *14th Australian Microelectronics Conference. Microelectronics: Technology Today for the Future. MICRO '97 Proceedings*, Sep. 28-Oct. 1, 1997, pp. 88-93.
Kim, Y., et al., "Fast GPU Implementation for the Solution of Tridiagonal Matrix Systems," *Journal of Korean Institute of Information Scientists and Engineers*, vol. 32, No. 12, pp. 692-704, Dec. 2005.
Kramberger, I., "DSP acceleration using a reconfigurable FPGA," *ISIE '99. Proceedings of the IEEE International Symposium on Industrial Electronics* (Cat. No. 99TH8465), vol. 3, Jul. 12-16, 1999, pp. 1522-1525.
Langhammer, M., "How to implement DSP in programmable logic," *Elettronica Oggi*, No. 266, Dec. 1998, pp. 113-115.
Langhammer, "Floating Point Datapath Synthesis for FPGAs," *IEEE International Conference on Field Programmable Logic and Application, 2008* (FPL 2008), pp. 355-360 (Sep. 8-10, 2008).
Langhammer, M., "Implementing a DSP in Programmable Logic," *Online EE Times*, May 1998, http:--www.eetimes.com-editorial-1998-coverstory9805.html.
Lazaravich, B.V., "Function block oriented field programmable logic arrays," *Motorola, Inc. Technical Developments*, vol. 18, Mar. 1993, pp. 10-11.
Lattice Semiconductor Corp *ORCA® FPGA Express™ Interface Manual: ispLEVER® Version 3.0*, 2002.
Lucent Technologies, Microelectronics Group,"Implementing and Optimizing Multipliers in ORCA™ FPGAs,", Application Note. AP97-008FGPA, Feb. 1997.
Lund, D., et al., "A new development system for reconfigurable digital signal processing," First International Conference on 3G Mobile Communication Technologies (Conf. Publ. No. 471), Mar. 27-29, 2000, pp. 306-310.

(56) References Cited

OTHER PUBLICATIONS

Martinson, L. et al., "Digital matched Filtering with Pipelined Floating Point Fast Fourier Transforms (FFT's)," *IEEE Transactions on Acoustics, Speech, and Signal Processing*, vol. ASSP-23, No. 2, pp. 222-234, Apr. 1975.

Miller, N.L., et al., "Reconfigurable integrated circuit for high performance computer arithmetic," *Proceedings of the 1998 IEE Colloquium on Evolvable Hardware Systems (Digest)*, No. 233, 1998, pp. 2-1-2-4.

Mintzer, L., "Xilinx FPGA as an FFT processor," *Electronic Engineering*, vol. 69, No. 845, May 1997, pp. 81, 82, 84.

Faura et al., "A Novel Mixed Signal Programmable Device With On-Chip Microprocessor," Custom Integrated Circuits Conference, 1997. Proceedings of the IEEE 1997 Santa Clara, CA, USA, May 5, 1997, pp. 103-106.

Nakasato, N., et al., "Acceleration of Hydrosynamical Simulations using a FPGA board" *The Institute of Electronics Information and Communication Technical Report CPSY2005-47*, vol. 105, No. 515, Jan. 17, 2006.

Nedjah, N., et al., "Fast Less Recursive Hardware for Large Number Multiplication Using Karatsuba-Ofman's Algorithm," *Computer and Information Sciences—ISCIS*, pp. 43-50, 2003.

Nozal, L., et al., "A new vision system: programmable logic devices and digital signal processor architecture (PLD+DSP)," *Proceedings IECON '91. 1991 International Conference on Industrial Electronics, Control and Instrumentation* (Cat. No. 91CH2976-9), vol. 3, Oct. 28-Nov. 1, 1991, pp. 2014-2018.

Osana, Y., et al., "Hardware-resource Utilization Analysis on an FPGA-Based Biochemical Simulator ReCSiP", *The Institute of Electronics Information and Communication Technical Report CPSY2005-63*, vol. 105, No. 516, Jan. 18, 2006.

Papenfuss, J.R, et al., "Implementation of a real-time, frequency selective, RF channel simulator using a hybrid DSP-FPGA architecture," *RAWCON 2000: 2000 IEEE Radio and Wireless Conference* (Cat. No. 00EX404), Sep. 10-13, 2000, pp. 135-138.

Parhami, B., "Configurable arithmetic arrays with data-driven control," *34th Asilomar Conference on Signals, Systems and Computers*, vol. 1, 2000, pp. 89-93.

"The QuickDSP Design Guide", Quicklogic, Aug. 2001, revision B.

"QuickDSP™ Family Data Sheet", *Quicklogic*, Aug. 7, 2001, revision B.

Rangasayee, K., "Complex PLDs let you produce efficient arithmetic designs," *EDN (European Edition)*, vol. 41, No. 13, Jun. 20, 1996, pp. 109, 110, 112, 114, 116.

Rosado, A., et al., "A high-speed multiplier coprocessor unit based on FPGA," *Journal of Electrical Engineering*, vol. 48, No. 11-12, 1997, pp. 298-302.

Santillan-Q., G.F., et al., "Real-time integer convolution implemented using systolic arrays and a digit-serial architecture in complex programmable logic devices," *Proceedings of the Third International Workshop on Design of Mixed-Mode Integrated Circuits and Applications* (Cat. No. 99EX303), Jul. 26-28, 1999, pp. 147-150.

Texas Instruments Inc., "TMS320C54x DSP Reference Set, vol. 1: CPU and Peripherals", Literature No. SPRU131F, Apr. 1999, pp. 2-1 through 2-16 and 4-1 through 4-29.

Thapliyal, H., et al., "Combined Integer and Floating Point Multiplication Architecture (CIFM) for FPGSs and Its Reversible Logic Implementation", *Proceedings MWSCA 2006*, Puerto Rico, 5 pages, Aug. 2006.

Thapliyal, H., et al., "Combined Integer and Variable Precision (CIVP) Floating Point Multiplication Architecture for FPGAs", *Proceedings of the 2007 International Conference on Parallel and Distributed Processing Techniques and Applications (PDPTA'07)*, Las Vegas, US, vol. 1, pp. 449-450, Jun. 2007.

Tisserand, A., et al., "An on-line arithmetic based FPGA for low power custom computing," *Field Programmable Logic and Applications, 9th International Workshop, FPL'99, Proceedings (Lecture Notes in Computer Science* vol. 1673), Lysaght, P., et al., eds., Aug. 30-Sep. 1, 1999, pp. 264-273.

Tralka, C., "Symbiosis of DSP and PLD," *Elektronik*, vol. 49, No. 14, Jul. 11, 2000, pp. 84-96.

Underwood, K. "FPGAs vs. CPUs: Trends in Peak Floating-Point Performance," *Proceedings of the 2004 ACM-SIGDA 12th International Symposium on Field Programmable Gate Arrays*, pp. 171-180, Feb. 22-24, 2004.

Valls, J., et al., "A Study About FPGA-Based Digital Filters," *Signal Processing Systems, 1998*, SIPS 98, 1998 IEEE Workshop, Oct. 10, 1998, pp. 192-201.

"Virtex-II 1.5V Field-Programmable Gate Arrays", *Xilinx*, Jan. 25, 2001, module 2 of 4.

"Virtex-II 1.5V Field-Programmable Gate Arrays", *Xilinx*, Apr. 2, 2001, module 1 of 4.

"Virtex-II 1.5V Field-Programmable Gate Arrays", *Xilinx*, Apr. 2, 2001, module 2 of 4.

Vladimirova, T. et al., "Floating-Point Mathematical Co-Processor for a Single-Chip On-Board Computer," *MAPLD'03 Conference*, D5, Sep. 2003.

Wajih, E.-H.Y. et al., "Efficient Hardware Architecture of Recursive Karatsuba-Ofman Multiplier," $3^{rd}$ *International Conference on Design and Technology of Integrated Systems in Nanoscale Era*, 6 pgs, Mar. 2008.

Walters, A.L., "A Scaleable FIR Filter Implementation Using 32-bit Floating-Point Complex Arithmetic on a FPGA Based Custom Computing Platform," Allison L. Walters, Thesis Submitted to the Faculty of Virginia Polytechnic Institute and State University, Jan. 30, 1998.

Weisstein, E.W., "Karatsuba Multiplication," *MathWorld—A Wolfram Web Resource* (Dec. 9, 2007), accessed Dec. 11, 2007 at http:--mathworld.wolfram.com-KaratsubaMultiplication.html.

Wenzel, L., "Field programmable gate arrays (FPGAs) to replace digital signal processor integrated circuits," *Elektronik*, vol. 49, No. 5, Mar. 7, 2000, pp. 78-86.

"Xilinx Unveils New FPGA Architecture to Enable High-Performance, 10 Million System Gate Designs", *Xilinx*, Jun. 22, 2000.

"Xilinx Announces DSP Algorithms, Tools and Features for Virtex-II Architecture", *Xilinx*, Nov. 21, 2000.

Xilinx Inc., "Virtex-II 1.5V Field-Programmable Gate Arrays", Advance Product Specification, DS031-2 (v1.9), Nov. 29, 2001, Module 2 of 4, pp. 1-39.

Xilinx Inc., "Using Embedded Multipliers", Virtex-II Platform FPGA Handbook, UG002 (v1.3), Dec. 3, 2001, pp. 251-257.

Xilinx, Inc., "A 1D Systolic FIR," copyright 1994-2002, downloaded from http:--www.iro.umontreal.ca-~aboulham-F6221-Xilinx%20A%201D%20systolic%20FIR.htm.

Xilinx, Inc., "The Future of FPGA's," White Paper, available Nov. 14, 2005 for download from http:--www.xilinx.com-prs_rls,5yrwhite.htm.

Xilinx Inc., "XtremeDSP Design Considerations User Guide," v 1.2, Feb. 4, 2005.

Xilinx Inc., "Complex Multiplier v2.0", DS291 Product Specification/Datasheet, Nov. 2004.

Xilinx, Inc., "Virtex-5 ExtremeDSP Design Considerations," *User Guide UG193*, v2.6, 114 pages, Oct. 2007.

Xilinx, Inc., "Implementing Barrel Shifters Using Multipliers", p. 1-4, Aug. 17, 2004.

Zhou, G. et al., "Efficient and High-Throughput Implementations of AES-GCM on FPGAs," *International Conference on Field-Programmable Technology*, 8 pgs., Dec. 2007.

\* cited by examiner

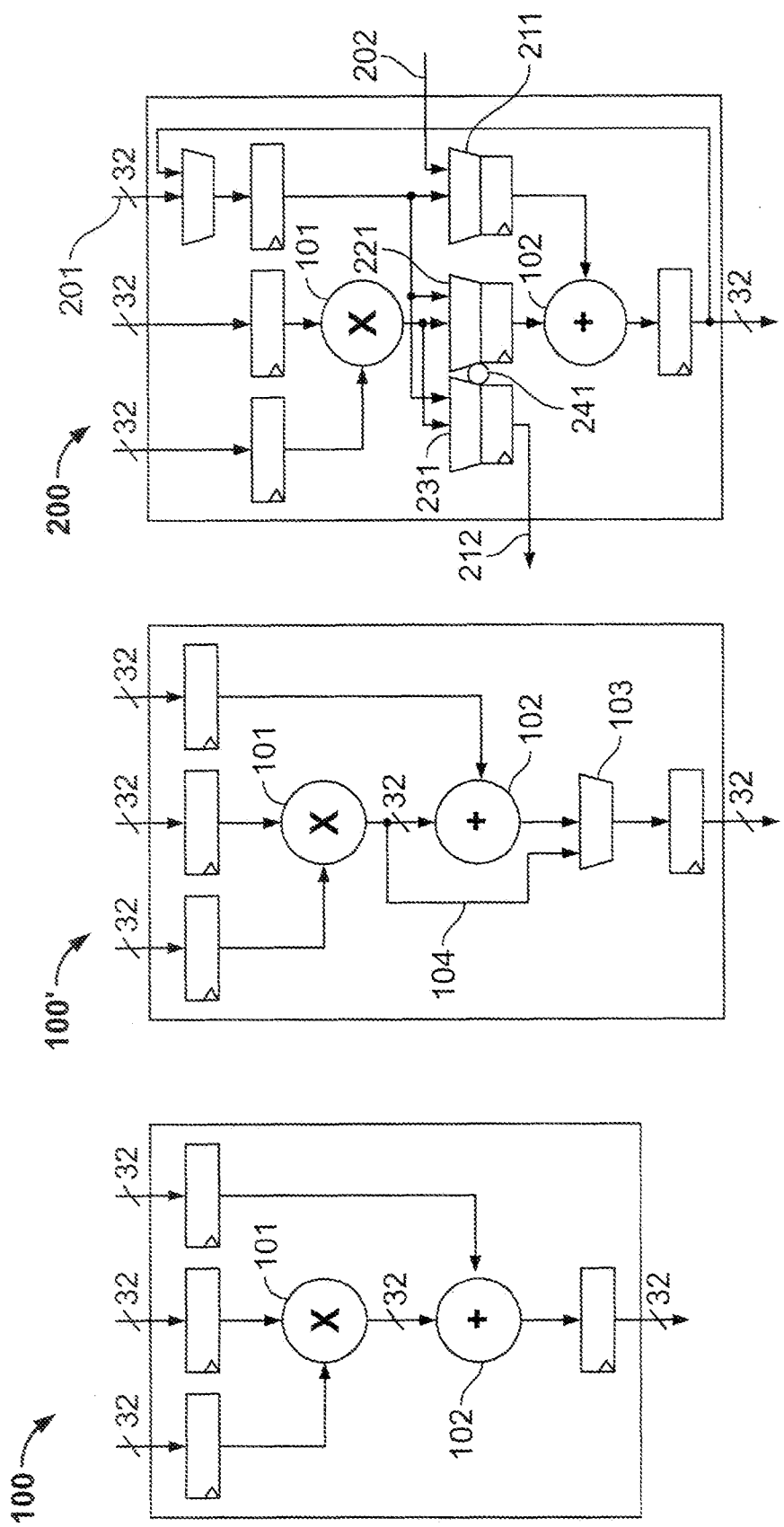

PROGRAMMABLE DEVICE USING FIXED AND CONFIGURABLE LOGIC TO IMPLEMENT FLOATING-POINT ROUNDING

FIELD OF THE INVENTION

This invention relates to a programmable integrated circuit device, and particularly to a configurable specialized processing block in a programmable integrated circuit device.

BACKGROUND OF THE INVENTION

Considering a programmable logic device (PLD) as one example of an integrated circuit device, as applications for which PLDs are used increase in complexity, it has become more common to design PLDs to include configurable specialized processing blocks in addition to blocks of generic programmable logic resources. Such configurable specialized processing blocks may include a concentration of circuitry on a PLD that has been partly or fully hardwired to perform one or more specific tasks, such as a logical or a mathematical operation. A configurable specialized processing block may also contain one or more specialized structures, such as an array of configurable memory elements. Examples of structures that are commonly implemented in such configurable specialized processing blocks include: multipliers, arithmetic logic units (ALUs), barrel-shifters, various memory elements (such as FIFO/LIFO/SIPO/RAM/ROM/CAM blocks and register files), AND/NAND/OR/NOR arrays, etc., or combinations thereof.

These fixed-logic elements within the configurable specialized processing blocks are interconnected by a configurable interconnect structure within the configurable specialized processing block. They may also be able to accept parameters as well as data inputs. Thus, while the elements are fixed in the type of arithmetic or logical functions that they perform, their interconnection within the block is flexible under user control, and moreover, if an element accepts parameters, then the way in which it performs its fixed function may be subject to a degree of user control. In addition, it may be possible to route the outputs of some or all of the fixed-logic elements within a block either to another fixed-logic element within the block or directly out of the block.

One particularly useful type of configurable specialized processing block that has been provided on PLDs is a digital signal processing (DSP) block, which may be used to process, e.g., audio signals. Such blocks are frequently also referred to as multiply-accumulate ("MAC") blocks, because they include structures to perform multiplication operations, and sums and/or accumulations of multiplication operations.

For example, PLDs sold by Altera Corporation, of San Jose, Calif., as part of the STRATIX® and ARRIA® families include DSP blocks, each of which includes a plurality of multipliers. Each of those DSP blocks also includes adders and registers, as well as programmable connectors (e.g., multiplexers) that allow the various components of the block to be configured in different ways.

Typically, the arithmetic operators (adders and multipliers) in such configurable specialized processing blocks have been fixed-point operators. If floating-point operators were needed, the user would construct them outside the configurable specialized processing block using general-purpose programmable logic of the device, or using a combination of the fixed-point operators inside the configurable specialized processing block with additional logic in the general-purpose programmable logic.

SUMMARY OF THE INVENTION

In accordance with embodiments of the present invention, configurable specialized processing blocks such as the DSP blocks described above may be enhanced by including floating-point addition among the functions available in the DSP block. This reduces the need to construct floating-point functions outside the configurable specialized processing block. The addition function may be a wholly or partially dedicated (i.e., "hard logic") implementation of addition in accordance with the IEEE754-1985 standard, and can be used for addition operations, multiply-add (MADD) operations, or vector (dot product) operations, any of which can be either real or complex. The floating-point adder circuit may be incorporated into the DSP Block, and can be independently accessed, or used in combination with a multiplier in the DSP block, or even multipliers in adjacent DSP blocks.

While rounding operations for the floating-point arithmetic operations in the configurable specialized processing block may be performed completely outside the configurable specialized processing block in the general-purpose programmable logic of the programmable device, in accordance with other embodiments of the invention, rounding operations may be performed partly inside the configurable specialized processing block and partly outside the configurable specialized processing block. This allows at least the portions of the rounding operations that are inefficient when performed in the general-purpose programmable logic to be performed in fixed logic.

Therefore, in accordance with embodiments of the present invention there is provided a configurable specialized processing block on a programmable integrated circuit device. The specialized processing block includes a first floating-point arithmetic operator stage, a second floating-point arithmetic operator stage, configurable interconnect within the configurable specialized processing block for routing signals into and out of each of the first and second floating-point arithmetic operator stages, and fixed rounding circuitry for performing a partial rounding operation on output of the second floating-point arithmetic operator stage. There is also provided a programmable integrated circuit device including a plurality of such configurable specialized processing blocks, with additional circuitry configured as additional rounding circuitry, as well as a method of configuring such a device.

BRIEF DESCRIPTION OF THE DRAWINGS

Further features of the invention, its nature and various advantages will be apparent upon consideration of the following detailed description, taken in conjunction with the accompanying drawings, in which like reference characters refer to like parts throughout, and in which:

FIG. 1 shows a logical diagram of an exemplary configurable specialized processing block incorporating an embodiment of the present invention;

FIG. 1A shows a logical diagram of an exemplary configurable specialized processing block incorporating an embodiment of the present invention;

FIG. 2 shows a more detailed diagram of an exemplary configurable specialized processing block according to an embodiment of the present invention;

DETAILED DESCRIPTION OF THE INVENTION

Figure 3:
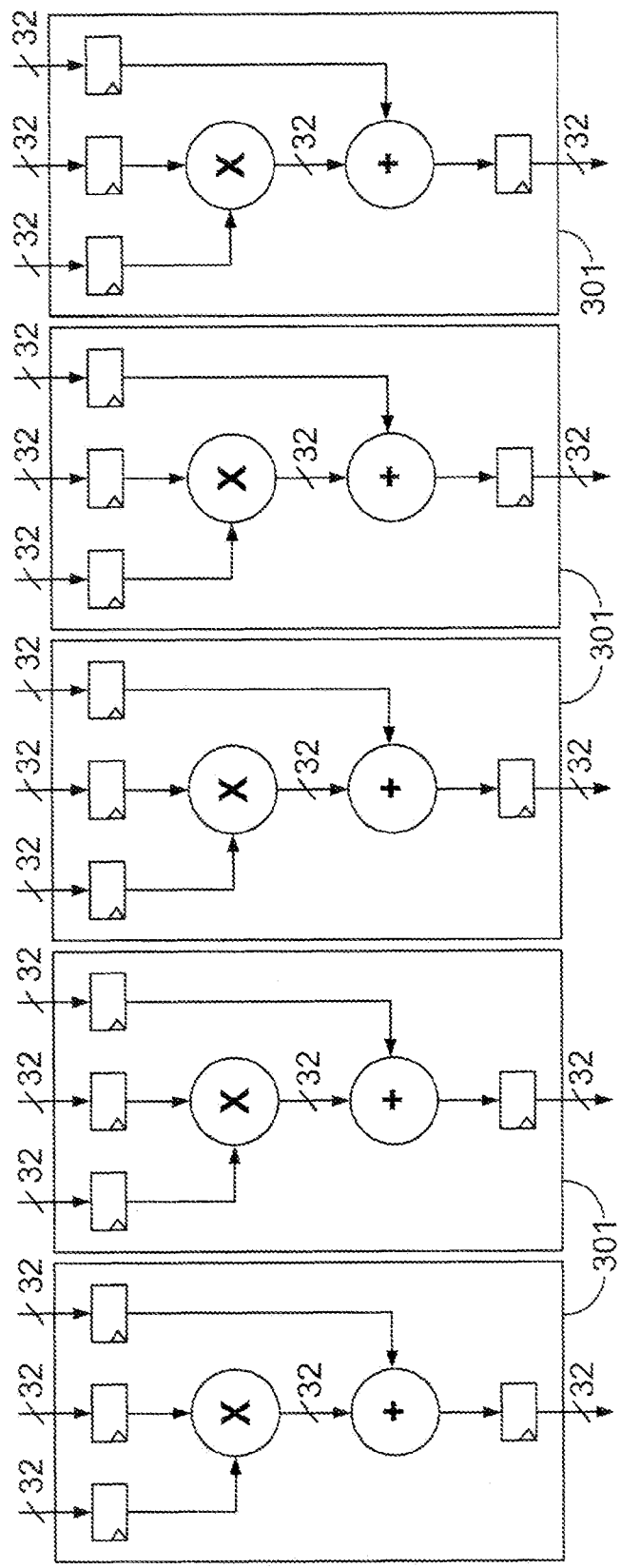
FIG. 3 shows a simplified block diagram of number of exemplary configurable specialized processing blocks according to an embodiment of the present invention, in an exemplary arrangement according to an embodiment of the present invention.

FIG. 1 shows a logical diagram of an exemplary DSP block 100 according to an embodiment of the invention. In this logical representation, implementational details, such as registers and some programmable routing features—such as multiplexers that may allow the output of a particular structure to be routed directly out of block 100—are omitted to simplify discussion. In addition, some elements that are shown may, in an actual embodiment, be implemented more than once. For example, the multiplier 101 may actually represent two or more multipliers, as in the DSP blocks of the aforementioned STRATIX® and ARRIA® families of PLDs.

In the logical representation of FIG. 1, the floating-point adder 102 follows a floating-point multiplier 101. The floating-point multiplier may be constructed from a 27×27 fixed-point multiplier supported by the DSP block provided in STRATIX® V or ARRIA® V programmable devices from Altera Corporation, and some additional logic. The additional logic calculates exponents, as well as special and error conditions such as NAN (not-a-number), Zero and Infinity. Optionally, other logic may be provided to round the result of the multiplier to IEEE754 format. Such rounding can be implemented as part of the final carry-propagate adder within the multiplier structure (not shown), or in programmable logic outside the DSP block 100 when the output of the multiplier 101 is outputted directly from the DSP block 100.

The floating point multiplier 101 can feed the floating point adder 102 directly in a multiplier-add (MADD) mode, as depicted in FIG. 1. Alternatively, as depicted in FIG. 1A, the multiplier 101 output can be routed around the adder 102 directly to the output of the DSP block, with a multiplexer 103 provided to select between the output of the multiplier 101 or the output of the adder 102. Although the bypass 104 and multiplexer 103 are omitted from the other drawings to avoid cluttering those drawings, they should be considered to be present in all of the multiplier/adder DSP blocks shown, including that of FIG. 1.

FIG. 2 shows a more detailed diagram of an exemplary DSP block 200 according to an embodiment of this invention. Optionally bypassable pipelining (not shown) may be provided between the floating-point multiplier 101 and the floating-point adder 102. Optionally bypassable pipelining (not shown) can also be provided within either or both of the floating-point multiplier 101 and the floating-point adder 102. Inputs can be routed to the adder 102 from multiple sources, including an output of the multiplier 101, one of the inputs 201 to the DSP block 200, or a direct connection 202 from an adjacent similar DSP block 200.

In addition, the output of multiplier 101 and/or one of the inputs 201 to the DSP block 200, can also be routed via a direct connection 212 to the adder in an adjacent similar DSP block 200 (it being apparent that, except at the ends of a chain of blocks 200, each direct connection 202 receives its input from a direct connection 212, and that each direct connection 212 provides its output to a direct connection 202). Specifically, multiplexer 211 may be provided to select either input 201 or direct connection 202 as one input to adder 102. Similarly, multiplexer 221 may be provided to select either input 201 or the output of multiplier 101 as another input to adder 102. A third multiplexer 231 may be provided to select either input 201 or the output of multiplier 101 as the output to direct connection 212. Thus the inputs to adder 102 can be either input 201 and the output of multiplier 101, or input 201 and direct connection 202, and direct connection 212 can output either input 201 or the output of multiplier 101.

In one embodiment, multiplexer 221 and multiplexer 231, which have the same two inputs (input 201 and the output of multiplier 101), share a control signal, but in the opposite sense as indicated at 241, so that if one of the two multiplexers selects one of those two inputs, the other of the two multiplexers selects the other of those two inputs.

Multiple DSP blocks according to embodiments of the invention may be arranged in a row or column, so that information can be fed from one block to the next using the aforementioned direct connections 202/212, to create more complex structures. FIG. 3 shows a number of exemplary DSP blocks 301 according to an embodiment of the invention, arranged in a row 300 (without showing connections 202/212).

Figure 4:
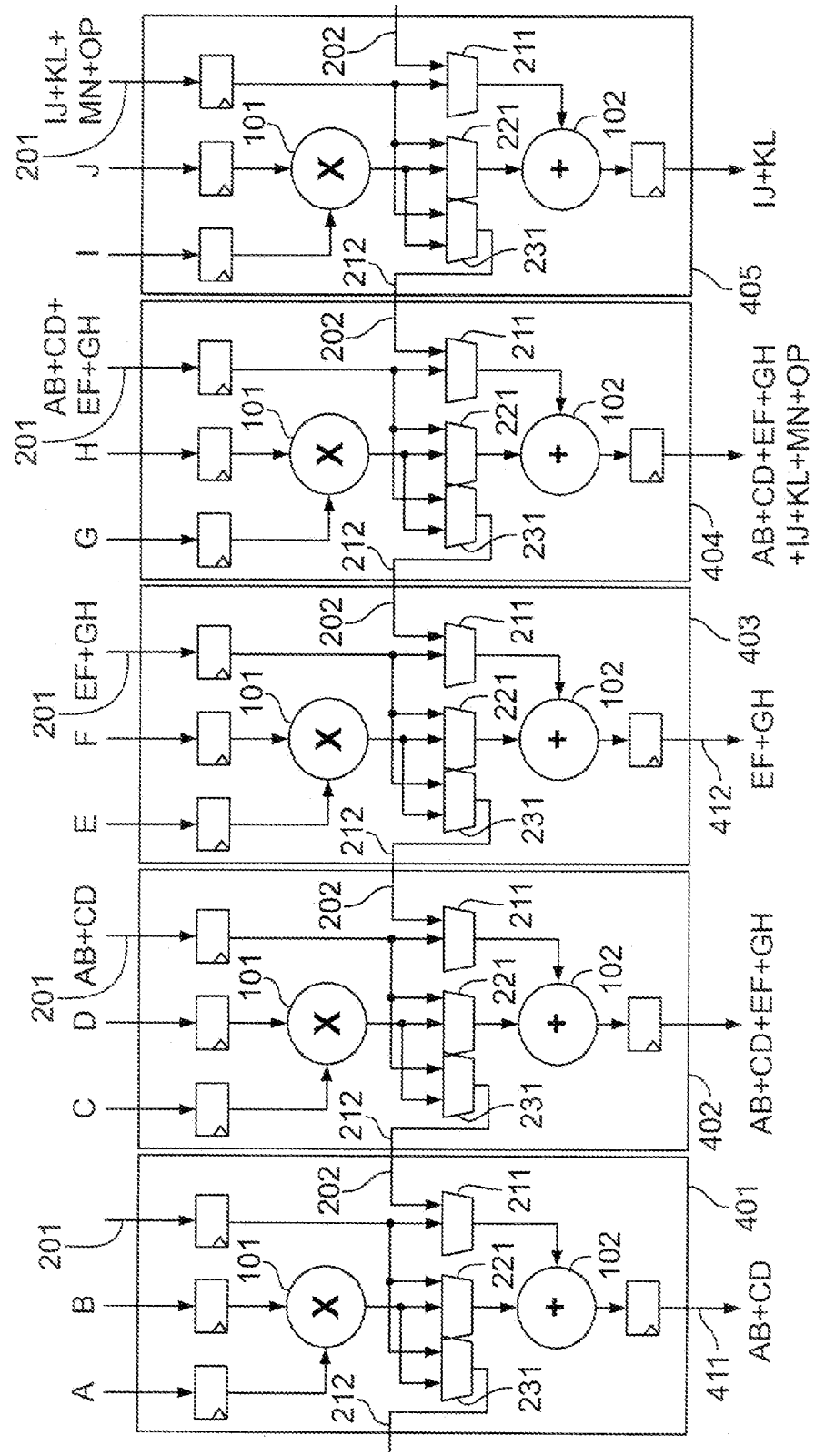
FIG. 4 shows an exemplary arrangement of exemplary configurable specialized processing blocks according to an embodiment of the invention configured to perform a dot product.

FIG. 4 shows a row 400 of five exemplary DSP blocks 401-405 according to an embodiment of the invention configured to perform a dot product operation. Alternatively, the DSP blocks 401 in that configuration could be arranged in a column (not shown) without changing the inputs and outputs. The drawing shows the interface signals. In each pair of blocks 401/402 and 403/404, the multiplier 101 in each block, along with the adder 102 in the leftmost block 401, 403 of the two blocks, implement a respective sum 411, 412 of two multiplication operations. Those sums 411, 412 are summed with the rightmost adder of the leftmost pair—i.e., adder 102 of DSP block 402—using multiplexer 211 to select input 202 and using multiplexer 221 to select input 201 (to which the respective output 411/412 has been routed, e.g., using programmable interconnect resources of the PLD outside the blocks 401-404)—to provide a sum of four multiplies. The rightmost adder of the rightmost pair—i.e., adder 102 of DSP block 404 is used to add this sum of four multiplies to the sum of four multiplies from another set of four DSP blocks beginning with DSP block 405 (remainder not shown). For N multipliers there will be N adders, which is sufficient to implement the adder tree of a dot product, which, for a pair of vectors of length N, is the sum of N multiplication operations.

The same DSP block features can be used to implement a complex dot product. Each second pair of DSP blocks would use a subtraction rather than an addition in the first level addition, which can be supported by the floating-point adder (e.g., by negating one of the inputs, in a straightforward manner). The rest of the adder tree is a straightforward sum construction, similar to that described in the preceding paragraph.

Figure 5:
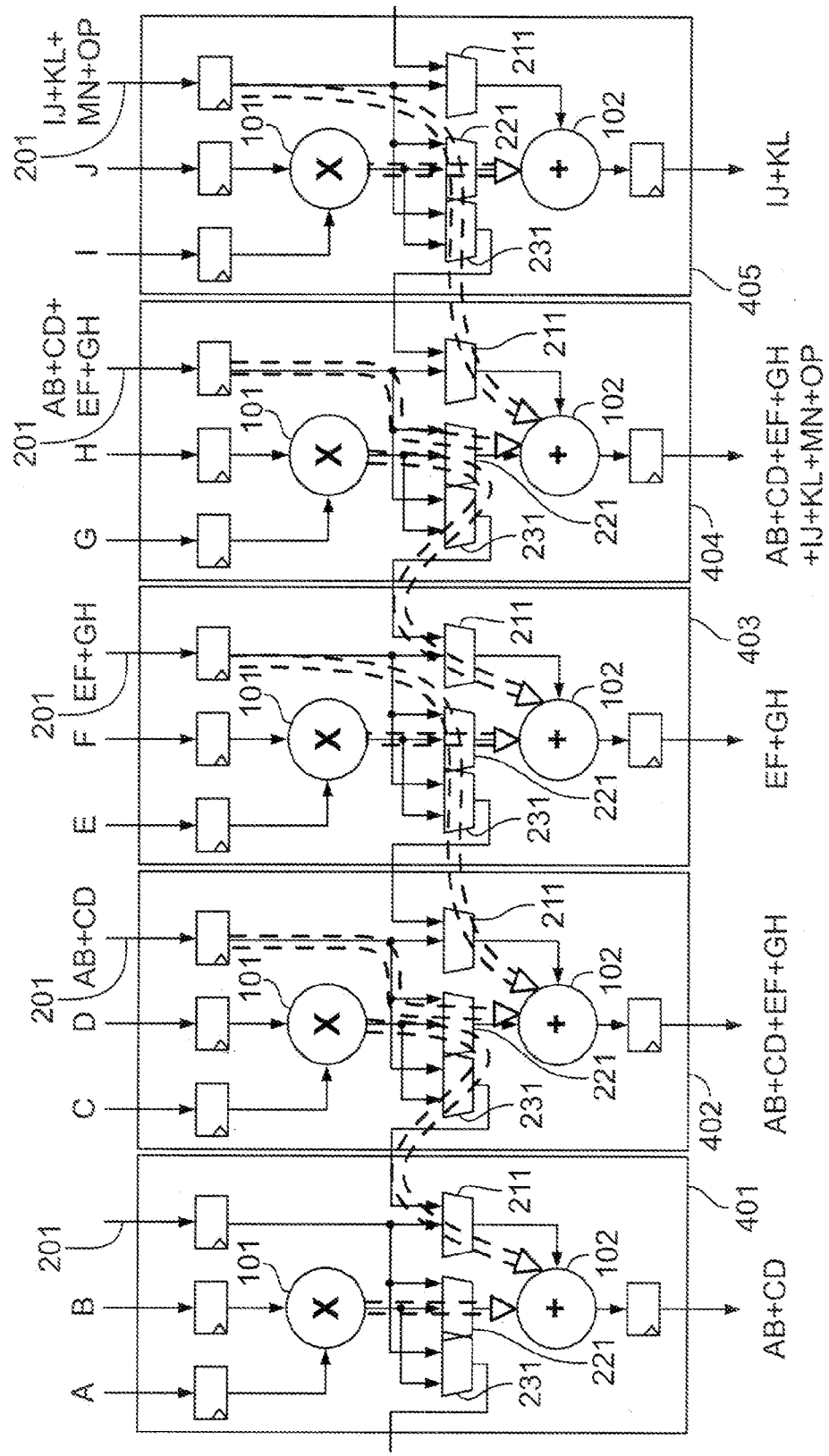
FIG. 5 shows an exemplary selection of datapaths when the exemplary arrangement of FIG. 4 is used to implement a vector dot product operation.

For the illustrated method of adder tree implementation, each DSP block output other than the output of the last block is fed back to the input of another DSP block. In some cases the output is fed back to an input of the same block, such as the EF+GH output 412 in FIG. 4. As seen in FIG. 2, an internal bus 250 may be provided to feed the output register of a block back to an input register, saving routing resources in the general-purpose programmable logic portion of the device. FIG. 5 shows in phantom an exemplary selection of datapaths by multiplexers 211, 221, 231 for the dot product application example described earlier in connection with FIG. 4, showing how adder 102 of each block 401-405 adds a product of the multiplier 101 in that block and a product from an adjacent block.

Figure 6:
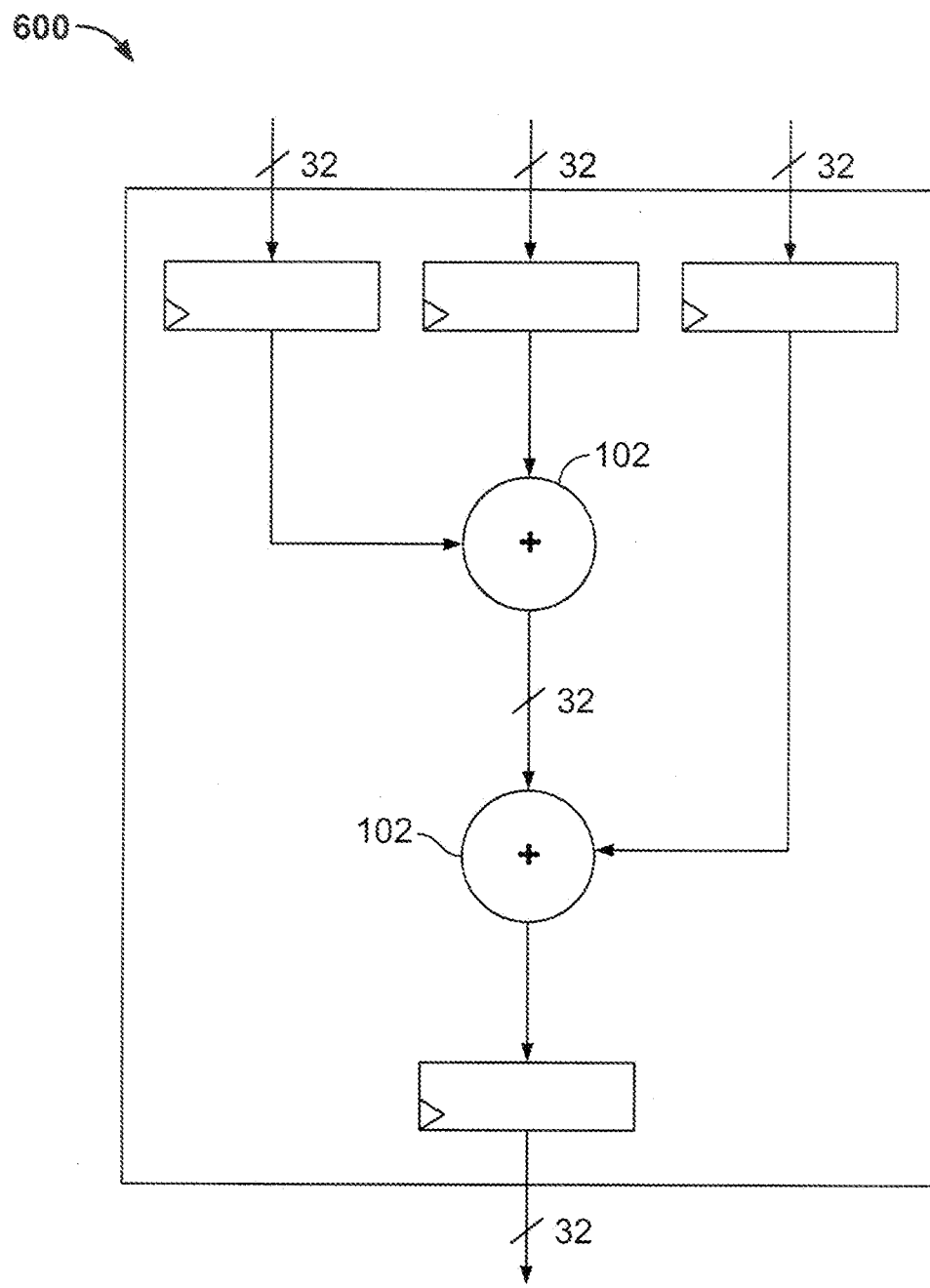
FIG. 6 shows an exemplary dedicated floating point adder block according to an embodiment of the present invention.

Another embodiment of a dedicated floating-point processing block is a dedicated floating-point adder block. Such a block can be binary (2 input operands) or ternary (3 input operands). FIG. 6 shows a logical block diagram of an exemplary ternary adder block 600. As with the previously described DSP block, pipelining may or may not be used internally, and rounding may be supported either internally or externally in programmable logic. Also as with the DSP block, the adder blocks can be arranged in rows, as shown in the example in FIG. 7, or columns. Alternatively, adder blocks can be interleaved (not shown) with the multiplier-adder DSP blocks described above.

Figure 7:
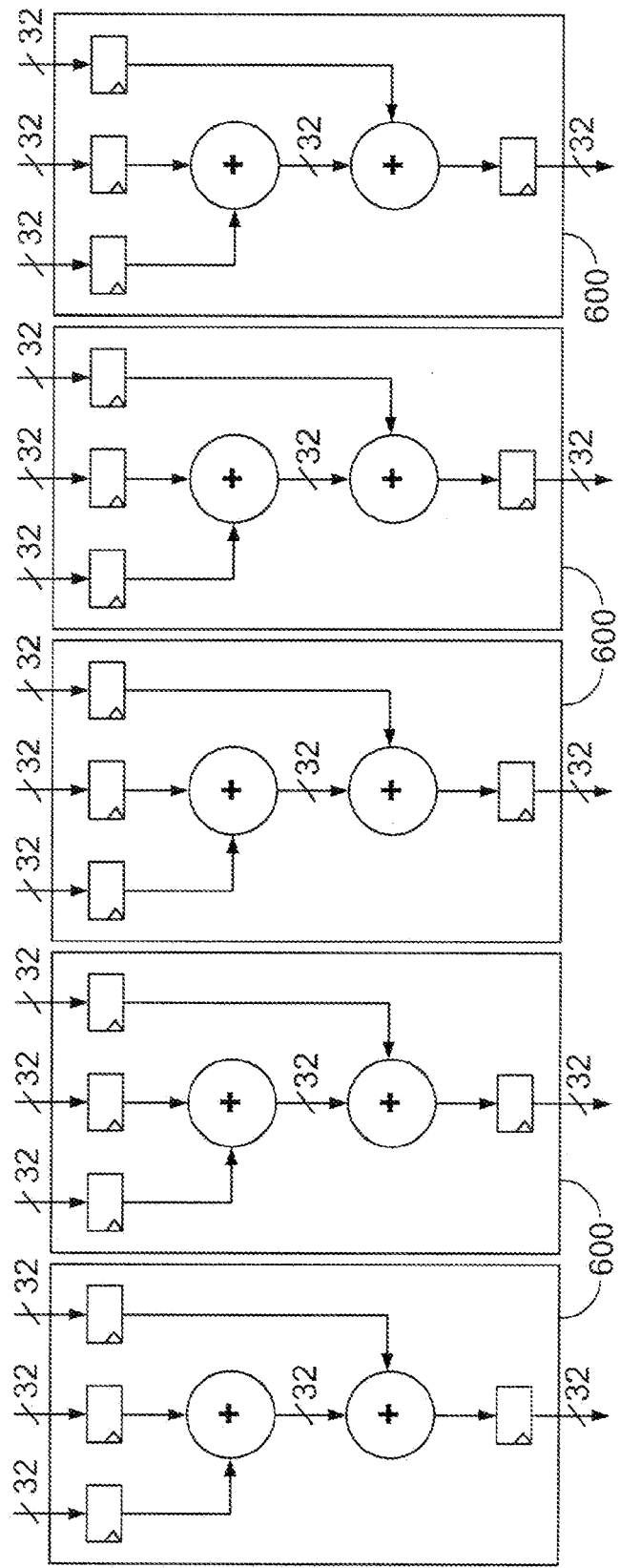
FIG. 7 shows an exemplary arrangement according to an embodiment of the invention, of a plurality of exemplary dedicated floating point adder blocks of FIG. 6.
Figure 8:
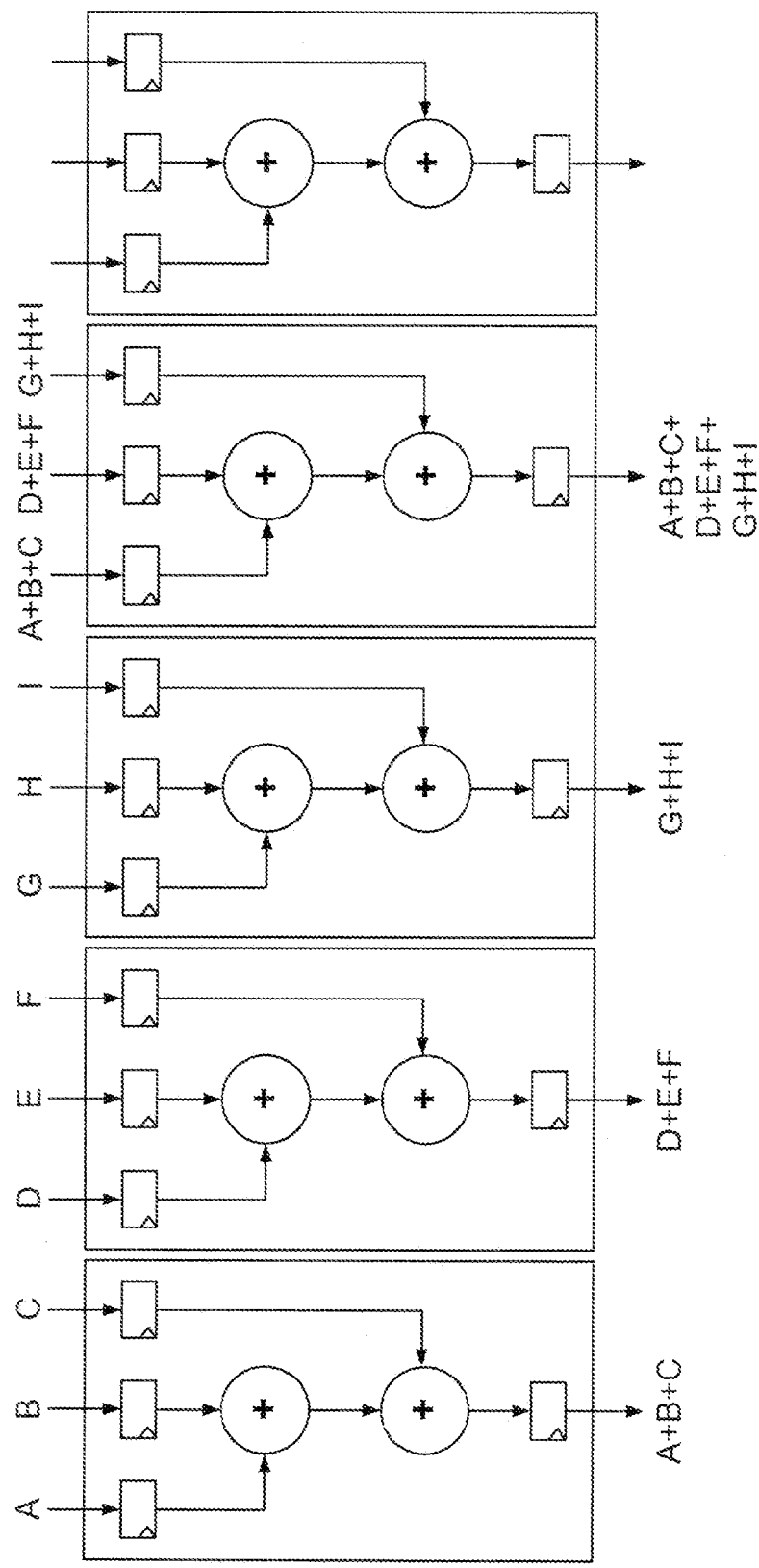
FIG. 8 shows an exemplary use of the arrangement of FIG. 8 as a ternary adder tree.

FIG. 8 shows, using labels, exemplary connections used with blocks 600 arranged as in FIG. 7 to make a ternary floating-point adder tree. The ternary adder tree has a depth of $\log_3 N$, which is half that of a binary adder. In this example, N=9, and four blocks are arranged in two levels (depth=$\log_3$ (9)=2).

Figure 9:
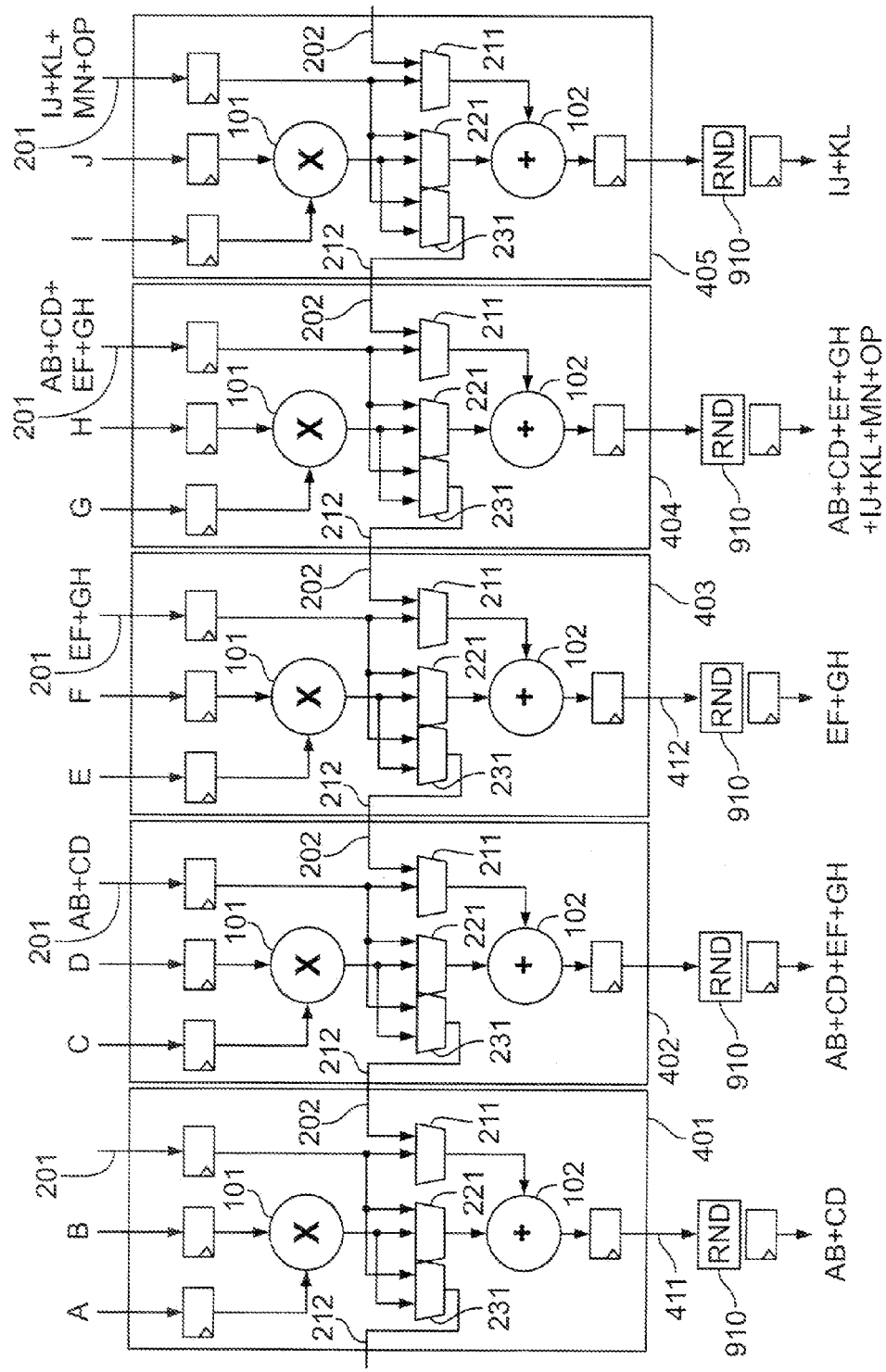
FIG. 9 shows an exemplary arrangement of exemplary configurable specialized processing blocks similar to FIG. 4 with rounding implemented outside the blocks.

As discussed above, IEEE754-compliant rounding can be provided inside embodiments of the DSP block, or can be implemented in the general-purpose programmable logic portion of the device. FIG. 9 shows as an example the arrangement of FIG. 4 with rounding implemented at 910 outside the block—i.e., in the general-purpose programmable logic portion of the device. The rounding can be implemented with a single level of logic, which may be as simple as a carry-propagate adder, followed by a register. Assuming, as is frequently the case, that all of the outputs of the DSP blocks must be rounded, there would be no disturbance or rebalancing of the datapath required.

Figure 11:
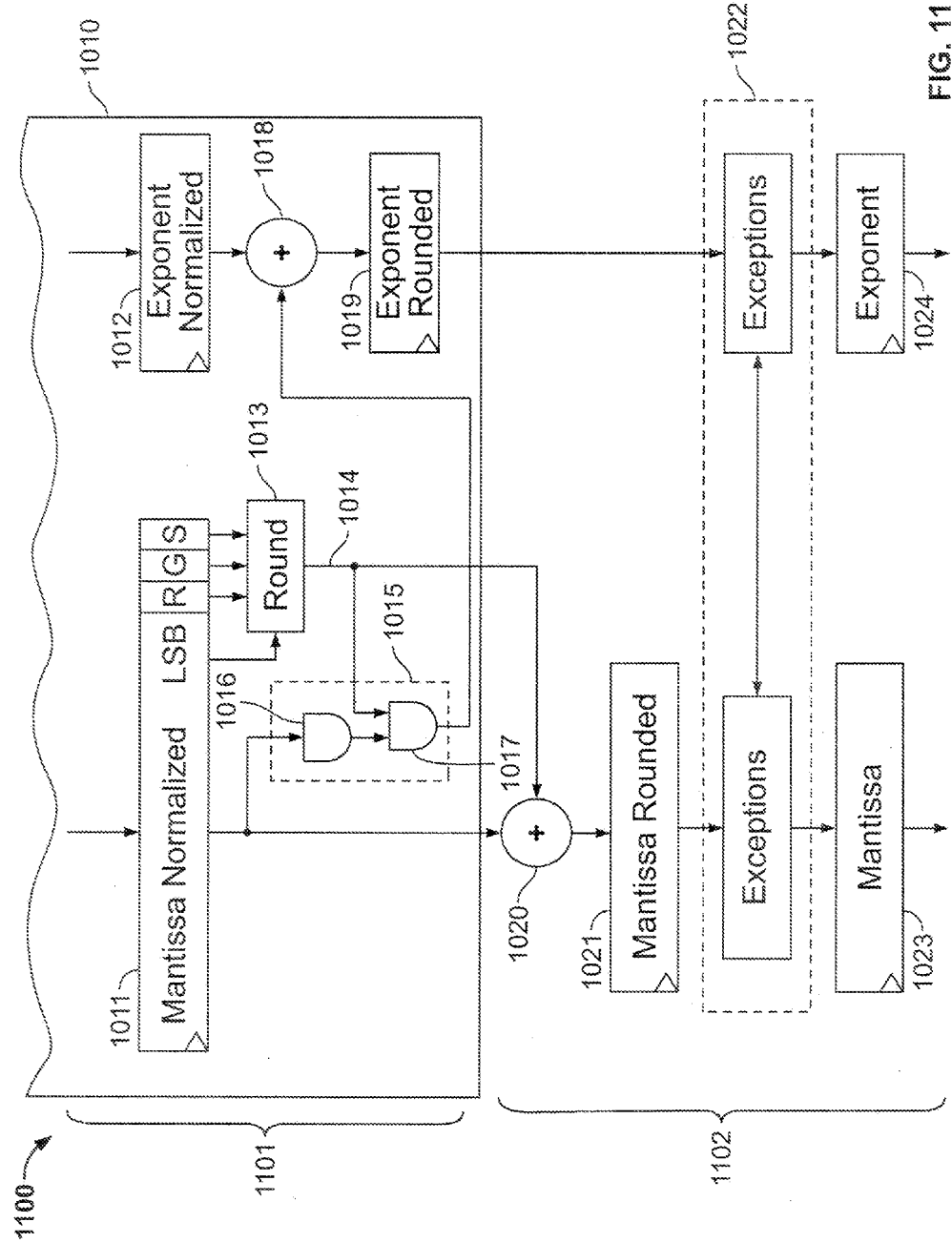
FIG. 11 shows an exemplary arrangement of a second embodiment of the invention in which rounding is performed partly inside a configurable specialized processing block and partly outside a configurable specialized processing block.
Figure 12:
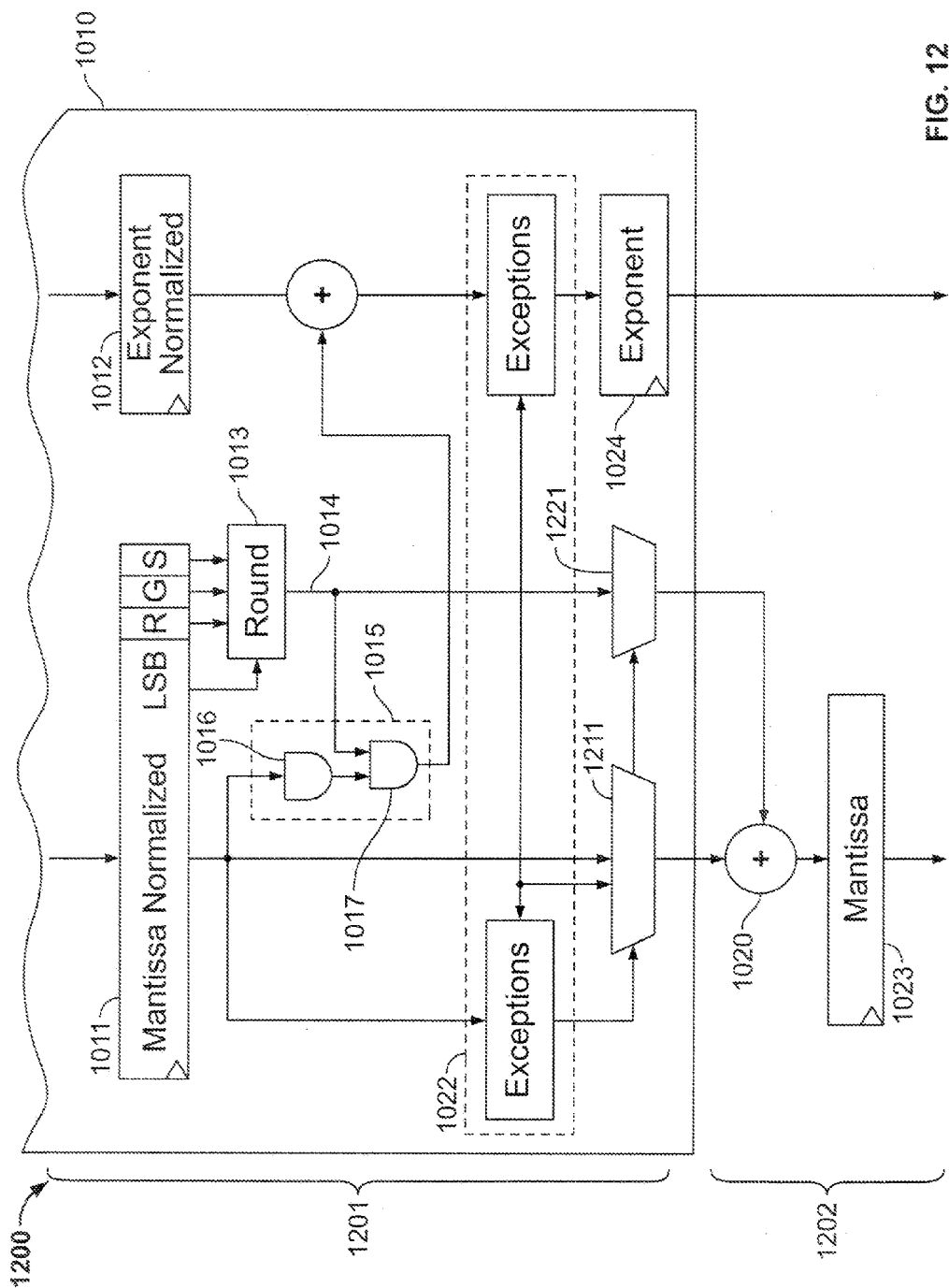
FIG. 12 shows an exemplary arrangement of a third embodiment of the invention in which rounding is performed partly inside a configurable specialized processing block and partly outside a configurable specialized processing block.

As further discussed above, rounding can be implemented partly inside the configurable specialized processing block and partly outside the configurable specialized processing block in the general-purpose programmable logic. Generally, portions of the rounding circuitry that are difficult or inefficient to implement in general-purpose programmable logic could be implemented in fixed logic in a configurable specialized processing block, while other portions of the rounding circuitry could be implemented in the general-purpose programmable logic. Three variants of such a scenario are illustrated in FIGS. 10-12.

Figure 10:
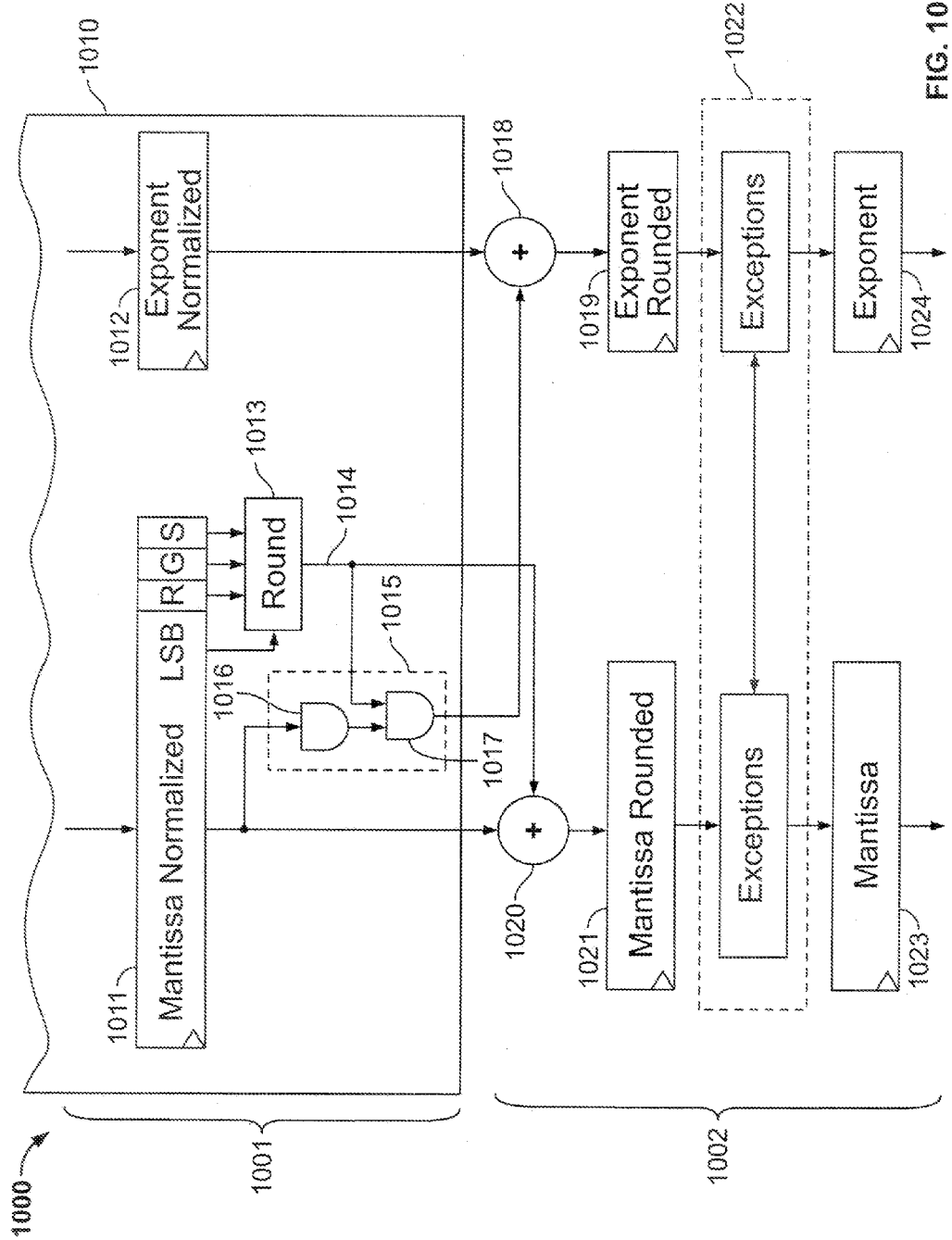
FIG. 10 shows an exemplary arrangement of a first embodiment of the invention in which rounding is performed partly inside a configurable specialized processing block and partly outside a configurable specialized processing block.

In a first variant shown in FIG. 10, portion 1001 of rounding circuitry 1000 is located within configurable specialized processing block 1010, while portion 1002 of rounding circuitry 1000 is located outside configurable specialized processing block 1010, in the general-purpose programmable logic. Portion 1001 is focused on calculation of an overflow condition of the output value, while portion 1002 calculates the value of a final exponent, as well as special or error conditions based on the overflow condition or lack thereof.

Specifically, register 1011 contains the mantissa of the final value calculated in configurable specialized processing block 1010—the final addition result—including normalized mantissa bits having a least-significant bit (LSB), as well as round (R), guard (G) and "sticky" (S) bits beyond the least significant bit, prior to rounding. Register 1012 contains the normalized exponent bits prior to rounding.

"Round" circuit 1013 determines, based on the least-significant, round, guard and sticky bits, whether or not rounding is needed. For example, one condition in which rounding is not needed is where LSB, R, G and S are all '0'. Output 1014 of circuit 1013 is routed to circuitry 1002 outside block 1010, and also to overflow detection circuitry 1015 inside block 1010. Overflow detection circuitry 1015 may be implemented, as shown, by AND-gate 1016 that ANDs all of the normalized mantissa bits down to the LSB. If all of those bits are '1', there may be an overflow if there is rounding, so AND-gate 1016 outputs a '1' and otherwise outputs a '0'. That output is ANDed at 1017 with the round output 1014 and if the result is a '1', there is an overflow, so that '1' is added at 1018, outside block 1010, to the previously calculated exponent to yield rounded exponent 1019. AND-gates 1016 and 1017 can be replaced with a single larger AND-gate (not shown).

Round output 1014 also is added outside block 1010 in adder 1020, to the normalized mantissa bits to yield rounded mantissa 1021. Rounded mantissa 1021 and rounded exponent 1019 are input to exception handling circuitry 1022 which determines, e.g., whether the result has an absolute value greater than the largest representable number ($2^{127}$ in IEEE754 single-precision arithmetic), and therefore should be set to ±∞, or whether the result has an absolute value smaller than the smallest representable number ($2^{-126}$ in IEEE754 single-precision arithmetic), and therefore should be set to '0'. The result is the final output mantissa 1023 and final output exponent 1024.

Other exception conditions may also be determined, such as NaN (not a number), but may require additional inputs. For example, an NaN condition is frequently the result of invalid inputs to the operators, so those inputs may also need to be provided directly (not shown) to exception handling circuitry 1022 in addition to being provided to the operators. Similarly, in the case of an NaN condition, the mantissa and exponent outputs 1023, 1024 would be meaningless and a separate NaN output (not shown) from exception handling circuitry 1022 might be provided.

In a second variant shown in FIG. 11, portion 1101 of rounding circuitry 1100 is located within configurable specialized processing block 1010, while portion 1102 of rounding circuitry 1100 is located outside configurable specialized processing block 1010, in the general-purpose programmable logic. Portion 1101 is similar to portion 1001 in FIG. 10, except that exponent adder 1018 has been moved inside block 1010 as part of portion 1101. This is possible because the number of bits in the exponent is much smaller than the number of bits in the mantissa, so that unlike adder 1020, adder 1018 can be efficiently implemented inside block 1010. To maintain timing, rounded exponent register 1019 also is moved into portion 1101 inside block 1010.

In a third variant shown in FIG. 12, portion 1201 of rounding circuitry 1200 is located within configurable specialized processing block 1010, while portion 1202 of rounding circuitry 1200 is located outside configurable specialized processing block 1010, in the general-purpose programmable logic. In this variant, exception handling 1022 as well as final exponent register 1024 are moved into portion 1201 inside block 1010, while only mantissa adder 1020 and final mantissa register 1023 remain in portion 1202 in the general-purpose programmable logic. Multiplexers 1211 and 1221 determine whether the rounded mantissa data or the exception values are output to adder 1020.

By providing configurable specialized processing blocks, including dedicated but configurable floating point operators, the present invention allows the implementation of certain operations, such as the vector dot product described above, with less reliance on programmable logic outside the blocks.

Instructions for carrying out a method according to this invention for programming a programmable device may be encoded on a machine-readable medium, to be executed by a suitable computer or similar device to implement the method of the invention for programming or configuring PLDs or other programmable devices. For example, a personal computer may be equipped with an interface to which a PLD can be connected, and the personal computer can be used by a user to program the PLD using suitable software tools.

Figure 13:
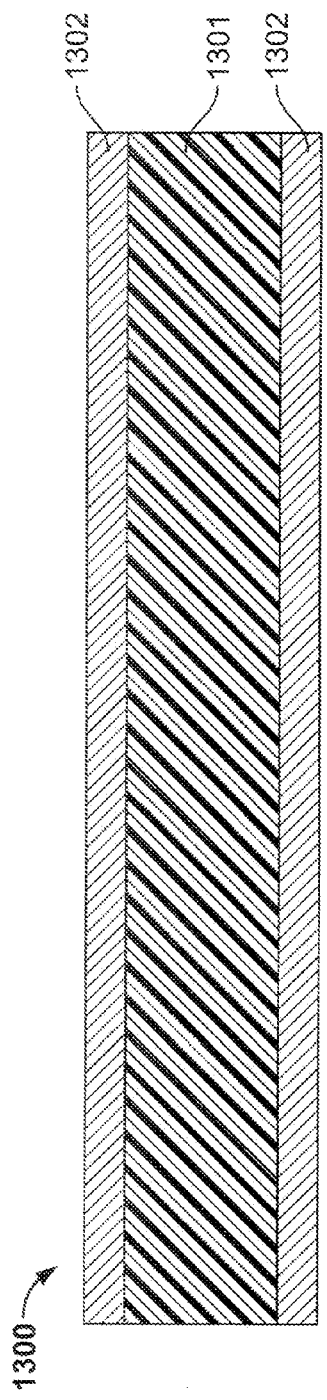
FIG. 13 is a cross-sectional view of a magnetic data storage medium encoded with a set of machine-executable instructions for performing a method according to the present invention.

FIG. 13 presents a cross section of a magnetic data storage medium 1300 which can be encoded with a machine executable program that can be carried out by systems such as the aforementioned personal computer, or other computer or similar device, or encoded with a library of virtual fabrics. Medium 1300 can be a floppy diskette or hard disk, or magnetic tape, having a suitable substrate 1301, which may be conventional, and a suitable coating 1302, which may be conventional, on one or both sides, containing magnetic domains (not visible) whose polarity or orientation can be altered magnetically. Except in the case where it is magnetic tape, medium 1300 may also have an opening (not shown) for receiving the spindle of a disk drive or other data storage device.

The magnetic domains of coating 1302 of medium 1300 are polarized or oriented so as to encode, in manner which may be conventional, a machine-executable program, for execution by a programming system such as a personal computer or other computer or similar system, having a socket or peripheral attachment into which the PLD to be programmed may be inserted, to configure appropriate portions of the PLD, including its configurable specialized processing blocks, if any, in accordance with the invention.

Figure 14:
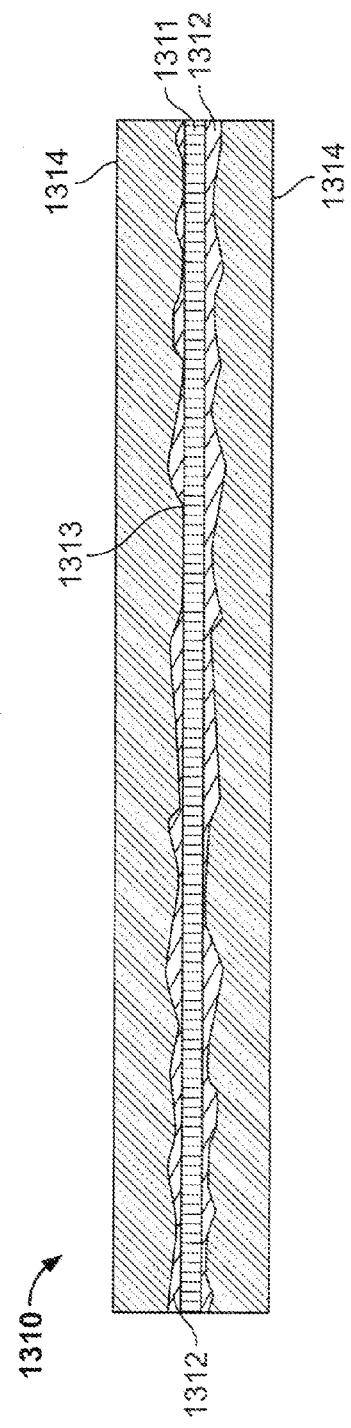
FIG. 14 is a cross-sectional view of an optically readable data storage medium encoded with a set of machine-executable instructions for performing a method according to the present invention.

FIG. 14 shows a cross section of an optically-readable data storage medium 1310 which also can be encoded with such a machine-executable program, which can be carried out by systems such as the aforementioned personal computer, or other computer or similar device, or encoded with a library of virtual fabrics. Medium 1310 can be a conventional compact disk read-only memory (CD-ROM) or digital video disk read-only memory (DVD-ROM) or a rewriteable medium such as a CD-R, CD-RW, DVD-R, DVD-RW, DVD+R, DVD+RW, or DVD-RAM or a magneto-optical disk which is optically readable and magneto-optically rewriteable. Medium 1310 preferably has a suitable substrate 1311, which may be conventional, and a suitable coating 1312, which may be conventional, usually on one or both sides of substrate 1311.

In the case of a CD-based or DVD-based medium, as is well known, coating 1312 is reflective and is impressed with a plurality of pits 1313, arranged on one or more layers, to encode the machine-executable program. The arrangement of pits is read by reflecting laser light off the surface of coating 1312. A protective coating 1314, which preferably is substantially transparent, is provided on top of coating 1312.

In the case of a magneto-optical disk, as is well known, coating 1312 has no pits 1313, but has a plurality of magnetic domains whose polarity or orientation can be changed magnetically when heated above a certain temperature, as by a laser (not shown). The orientation of the domains can be read by measuring the polarization of laser light reflected from coating 1312. The arrangement of the domains encodes the program as described above.

Figure 15:
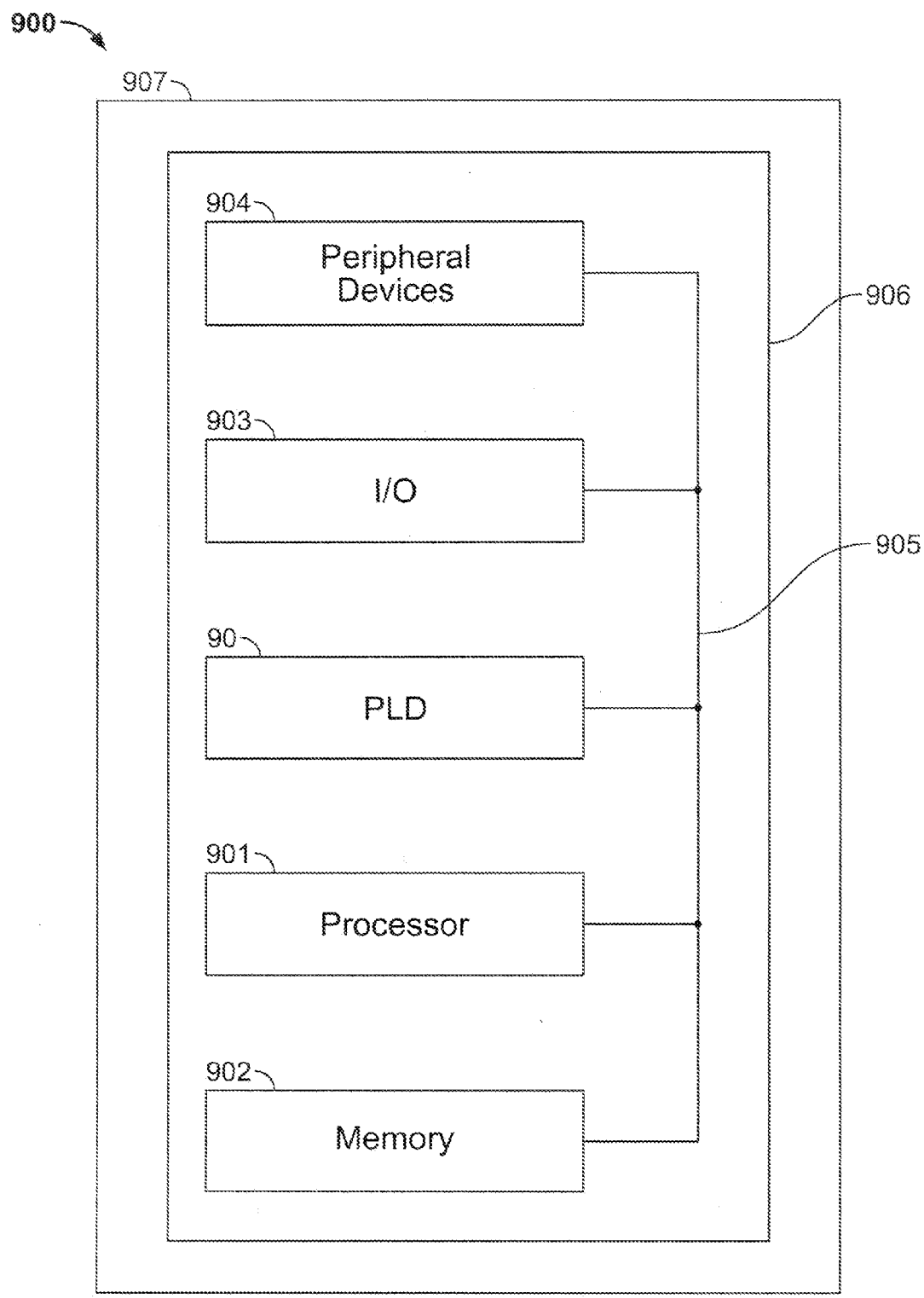
FIG. 15 is a simplified block diagram of an exemplary system employing a programmable logic device incorporating the present invention.

A PLD 90 incorporating configurable specialized processing blocks according to the present invention may be used in many kinds of electronic devices. One possible use is in an exemplary data processing system 900 shown in FIG. 15. Data processing system 900 may include one or more of the following components: a processor 901; memory 902; I/O circuitry 903; and peripheral devices 904. These components are coupled together by a system bus 905 and are populated on a circuit board 906 which is contained in an end-user system 907.

System 900 can be used in a wide variety of applications, such as computer networking, data networking, instrumentation, video processing, digital signal processing, or any other application where the advantage of using programmable or reprogrammable logic is desirable. PLD 90 can be used to perform a variety of different logic functions. For example, PLD 90 can be configured as a processor or controller that works in cooperation with processor 901. PLD 90 may also be used as an arbiter for arbitrating access to a shared resources in system 900. In yet another example, PLD 90 can be configured as an interface between processor 901 and one of the other components in system 900. It should be noted that system 900 is only exemplary, and that the true scope and spirit of the invention should be indicated by the following claims.

Various technologies can be used to implement PLDs 90 as described above and incorporating this invention.

It will be understood that the foregoing is only illustrative of the principles of the invention, and that various modifications can be made by those skilled in the art without departing from the scope and spirit of the invention. For example, the various elements of this invention can be provided on a PLD in any desired number and/or arrangement. One skilled in the art will appreciate that the present invention can be practiced by other than the described embodiments, which are presented for purposes of illustration and not of limitation, and the present invention is limited only by the claims that follow.

What is claimed is:

1. A configurable specialized processing block on an integrated circuit device, said configurable specialized processing block comprising:
   a first floating-point arithmetic operator stage;
   a second floating-point arithmetic operator stage;
   configurable interconnect within said configurable specialized processing block for routing signals into and out of each of said first and second floating-point arithmetic operator stages; and fixed rounding circuitry for performing a partial rounding operation on output of said second floating-point arithmetic operator stage, said fixed rounding circuitry comprising a rounding condition detector and an overflow detector, said overflow detector comprising:
a first AND-gate combining output mantissa bits of said second floating-point arithmetic operator stage, and
a second AND-gate combining output of said first AND-gate and output of said rounding condition detector.

2. The configurable specialized processing block of claim 1 wherein said rounding condition detector comprises:
circuitry that examines, for presence of at least one '1', both (a) a least-significant output mantissa bit of said second floating-point arithmetic operator stage, and (b) output bits of lesser significance of said second floating-point arithmetic operator stage.

3. The configurable specialized processing block of claim 1 wherein said fixed rounding circuitry further comprises an exponent adder adding output of said overflow detector to output exponent bits of said second floating-point arithmetic operator stage.

4. The configurable specialized processing block of claim 3 wherein said fixed rounding circuitry further comprises:
exception handling circuitry for determining when output of said second floating-point arithmetic operator stage is one of:
a number having an absolute value larger than can be represented by said second floating-point arithmetic operator stage; or
a number smaller than can be represented by said second floating-point arithmetic operator stage.

5. A programmable integrated circuit device configured for floating-point arithmetic operations, said configured programmable integrated circuit device comprising:
general-purpose programmable logic circuitry; and
a plurality of configurable specialized processing blocks, each of said configurable specialized processing blocks comprising:
a first floating-point arithmetic operator stage,
a second floating-point arithmetic operator stage,
configurable interconnect within said configurable specialized processing block for routing signals into and out of each of said first and second floating-point arithmetic operator stages, and
fixed rounding circuitry for performing a first partial rounding operation on output of said second floating-point arithmetic operator stage, said fixed rounding circuitry comprising a rounding condition detector and an overflow detector, said overflow detector comprising:
a first AND-gate combining output mantissa bits of said second floating-point arithmetic operator stage, and
a second AND-gate combining output of said first AND-gate and output of said rounding condition detector; wherein:
a portion of said general-purpose programmable logic is configured as additional rounding circuitry for performing a further partial rounding operation on output of said fixed rounding circuitry of at least one of said plurality of configurable specialized processing blocks.

6. The configured programmable integrated circuit device of claim 5 wherein said rounding condition detector comprises:
circuitry that examines, for presence of at least one '1', both (a) a least-significant output mantissa bit of said second floating-point arithmetic operator stage, and (b) output bits of lesser significance of said second floating-point arithmetic operator stage.

7. The configured programmable integrated circuit device of claim 5 wherein said portion of said general-purpose programmable logic configured as additional rounding circuitry comprises, for at least one of said configurable specialized processing blocks:
a mantissa adder adding output mantissa bits of said second floating-point arithmetic operator stage to output of said rounding condition detector;
an exponent adder adding output of said overflow detector to output exponent bits of said second floating-point arithmetic operator stage; and
exception handling circuitry for determining when output of said second floating-point arithmetic operator stage is one of:
a number having an absolute value larger than can be represented by said second floating-point arithmetic operator stage, or
a number smaller than can be represented by said second floating-point arithmetic operator stage.

8. The configured programmable integrated circuit device of claim 5 wherein:
for at least one of said configurable specialized processing blocks, said fixed rounding circuitry further comprises an exponent adder adding output of said overflow detector to output exponent bits of said second floating-point arithmetic operator stage; and
said portion of said general-purpose programmable logic configured as additional rounding circuitry comprises, for said at least one of said configurable specialized processing blocks:
a mantissa adder adding output mantissa bits of said second floating-point arithmetic operator stage to output of said rounding condition detector; and
exception handling circuitry for determining when output of said second floating-point arithmetic operator stage is one of:
a number having an absolute value larger than can be represented by said second floating-point arithmetic operator stage, or
a number smaller than can be represented by said second floating-point arithmetic operator stage.

9. The configured programmable integrated circuit device of claim 5 wherein:
for at least one of said configurable specialized processing blocks, said fixed rounding circuitry further comprises an exponent adder adding output of said overflow detector to output exponent bits of said second floating-point arithmetic operator stage, and
exception handling circuitry for determining when output of said second floating-point arithmetic operator stage is one of:
a number having an absolute value larger than can be represented by said second floating-point arithmetic operator stage, or
a number smaller than can be represented by said second floating-point arithmetic operator stage; and
said portion of said general-purpose programmable logic configured as additional rounding circuitry comprises, for said at least one of said configurable specialized processing blocks:
a mantissa adder adding output mantissa bits of said second floating-point arithmetic operator stage to output of said rounding condition detector.

10. A method of configuring a programmable integrated circuit device for floating-point arithmetic operations, said programmable integrated circuit device comprising general-purpose programmable logic and a plurality of configurable specialized processing blocks, each of said configurable specialized processing blocks including:
  a first floating-point arithmetic operator stage,
  a second floating-point arithmetic operator stage,
  configurable interconnect within said configurable specialized processing block for routing signals into and out of each of said first and second floating-point arithmetic operator stages, and
  fixed rounding circuitry for performing a first partial rounding operation on output of said second floating-point arithmetic operator stage, wherein, in at least one of said configurable specialized processing blocks, said fixed rounding circuitry comprises:
  (a) a rounding condition detector and an overflow detector, or
  (b) a rounding condition detector, an overflow detector, and an exponent adder adding output of said overflow detector to output exponent bits of said second floating-point arithmetic operator stage, or
  (c) a rounding condition detector, an overflow detector, an exponent adder adding output of said overflow detector to output exponent bits of said second floating-point arithmetic operator stage, and exception handling circuitry for determining when output of said second floating-point arithmetic operator stage is one of:
    a number having an absolute value larger than can be represented by said second floating-point arithmetic operator stage, or
    a number smaller than can be represented by said second floating-point arithmetic operator stage; said method comprising:
  configuring said configurable interconnect to route output of said second floating-point arithmetic operator stage to said fixed rounding circuitry; and
  configuring a portion of said general-purpose programmable logic as additional rounding circuitry for performing a further partial rounding operation on output of said fixed rounding circuitry of at least one of said plurality of configurable specialized processing blocks, including, for said at least one of said configurable specialized processing blocks:
  configuring a mantissa adder adding output mantissa bits of said second floating-point arithmetic operator stage to output of said rounding condition detector.

11. The method of claim 10 wherein:
  in at least one of said configurable specialized processing blocks, said fixed rounding circuitry comprises said rounding condition detector, and said overflow detector; and
  said configuring said portion of said general-purpose programmable logic as additional rounding circuitry further comprises, for said at least one of said configurable specialized processing blocks:
  configuring an exponent adder adding output of said overflow detector to output exponent bits of said second floating-point arithmetic operator stage; and
  configuring exception handling circuitry for determining when output of said second floating-point arithmetic operator stage is one of:
  a number having an absolute value larger than can be represented by said second floating-point arithmetic operator stage, or
  a number smaller than can be represented by said second floating-point arithmetic operator stage.

12. The method of claim 10 wherein:
  in at least one of said configurable specialized processing blocks, said fixed rounding circuitry comprises said rounding condition detector, said overflow detector, and said exponent adder adding output of said overflow detector to output exponent bits of said second floating-point arithmetic operator stage; and
  said configuring said portion of said general-purpose programmable logic as additional rounding circuitry further comprises, for said at least one of said configurable specialized processing blocks:
  configuring exception handling circuitry for determining when output of said second floating-point arithmetic operator stage is one of:
  a number having an absolute value larger than can be represented by said second floating-point arithmetic operator stage, or
  a number smaller than can be represented by said second floating-point arithmetic operator stage.

13. A non-transitory data storage medium encoded with machine-executable instructions for performing a method of configuring a programmable integrated circuit device for floating-point arithmetic operations, said programmable integrated circuit device comprising general-purpose programmable logic and a plurality of configurable specialized processing blocks, each of said configurable specialized processing blocks including:
  a first floating-point arithmetic operator stage,
  a second floating-point arithmetic operator stage,
  configurable interconnect within said configurable specialized processing block for routing signals into and out of each of said first and second floating-point arithmetic operator stages, and
  fixed rounding circuitry for performing a first partial rounding operation on output of said second floating-point arithmetic operator stage, wherein, in at least one of said configurable specialized processing blocks, said fixed rounding circuitry comprises:
  (a) a rounding condition detector and an overflow detector, or
  (b) a rounding condition detector, an overflow detector, and an exponent adder adding output of said overflow detector to output exponent bits of said second floating-point arithmetic operator stage, or
  (c) a rounding condition detector, an overflow detector, an exponent adder adding output of said overflow detector to output exponent bits of said second floating-point arithmetic operator stage, and exception handling circuitry for determining when output of said second floating-point arithmetic operator stage is one of:
    a number having an absolute value larger than can be represented by said second floating-point arithmetic operator stage, or
    a number smaller than can be represented by said second floating-point arithmetic operator stage; said instructions comprising:
  instructions to configure said configurable interconnect to route output of said second floating-point arithmetic operator stage to said fixed rounding circuitry; and
  instructions to configure a portion of said general-purpose programmable logic as additional rounding circuitry for performing a further partial rounding operation on output of said fixed rounding circuitry of at least one of said plurality of configurable specialized processing blocks, including, for said at least one of said configurable specialized processing blocks:
  instructions to configure a mantissa adder adding output mantissa bits of said second floating-point arithmetic operator stage to output of said rounding condition detector.

14. The non-transitory data storage medium of claim 13 wherein:

in at least one of said configurable specialized processing blocks, said fixed rounding circuitry comprises said rounding condition detector, and said overflow detector; and said instructions to configure said portion of said general-purpose programmable logic as additional rounding circuitry further comprise, for at least one of said configurable specialized processing blocks:

instructions to configure an exponent adder adding output of said overflow detector to output exponent bits of said second floating-point arithmetic operator stage; and instructions to configure exception handling circuitry for determining when output of said second floating-point arithmetic operator stage is one of:

a number having an absolute value larger than can be represented by said second floating-point arithmetic operator stage, or a number smaller than can be represented by said second floating-point arithmetic operator stage.

15. The non-transitory data storage medium of claim 13 wherein:

in at least one of said configurable specialized processing blocks, said fixed rounding circuitry comprises said rounding condition detector, said overflow detector, and said exponent adder adding output of said overflow detector to output exponent bits of said second floating-point arithmetic operator stage; and said instructions to configure said portion of said general-purpose programmable logic as additional rounding circuitry further comprise, for said at least one of said configurable specialized processing blocks:

instructions to configure exception handling circuitry for determining when output of said second floating-point arithmetic operator stage is one of:

a number having an absolute value larger than can be represented by said second floating-point arithmetic operator stage, or a number smaller than can be represented by said second floating-point arithmetic operator stage.

* * * * *